US008060906B2

(12) United States Patent
Begeja et al.

(10) Patent No.: US 8,060,906 B2
(45) Date of Patent: Nov. 15, 2011

(54) METHOD AND APPARATUS FOR INTERACTIVELY RETRIEVING CONTENT RELATED TO PREVIOUS QUERY RESULTS

(75) Inventors: Lee Begeja, Gillette, NJ (US); David Crawford Gibbon, Lincroft, NJ (US); Zhu Liu, Marlboro, NJ (US); Bernard S. Renger, New Providence, NJ (US); Kenneth H. Rosen, Middletown, NJ (US); Behzad Shahraray, Freehold, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1286 days.

(21) Appl. No.: 10/455,790

(22) Filed: Jun. 6, 2003

(65) Prior Publication Data

US 2004/0025180 A1   Feb. 5, 2004

Related U.S. Application Data

(63) Continuation-in-part of application No. 10/163,091, filed on Jun. 6, 2002, which is a continuation-in-part of application No. 10/034,679, filed on Dec. 28, 2001, now abandoned, said application No. 10/455,790 is a continuation-in-part of application No. 10/034,679.

(60) Provisional application No. 60/282,204, filed on Apr. 6, 2001, provisional application No. 60/296,436, filed on Jun. 6, 2001, provisional application No. 60/385,915, filed on Jun. 6, 2002, provisional application No. 60/386,392, filed on Jun. 7, 2002.

(51) Int. Cl.
*H04N 5/445* (2006.01)
*H04N 7/16* (2006.01)

(52) U.S. Cl. ............................................. 725/46; 725/13

(58) Field of Classification Search .................... 725/46, 725/13
See application file for complete search history.

(56) References Cited

U.S. PATENT DOCUMENTS

| | | | |
|---|---|---|---|
| 5,532,735 | A | 7/1996 | Blahut et al. |
| 5,614,940 | A | 3/1997 | Cobbley et al. |
| 5,664,227 | A | 9/1997 | Mauldin et al. |
| 5,708,767 | A | 1/1998 | Yeo et al. |
| 5,710,591 | A | 1/1998 | Bruno et al. |
| 5,734,893 | A | 3/1998 | Li et al. |
| 5,805,763 | A | 9/1998 | Lawler et al. |
| 5,821,945 | A | 10/1998 | Yeo et al. |
| 5,835,087 | A * | 11/1998 | Herz et al. ..................... 715/810 |
| 5,835,667 | A | 11/1998 | Wactlar et al. |
| 5,864,366 | A | 1/1999 | Yeo |
| 5,874,986 | A | 2/1999 | Gibbon et al. |
| 5,924,105 | A | 7/1999 | Punch, III et al. |

(Continued)

OTHER PUBLICATIONS

Shahraray, B. "Scene Change Detection & Content-Based Sampling of Video Sequences," Proc. SPIE 2419. Digital Video Compression: Algorithms & Technologies, pp. 2-13, Feb. 1995.

(Continued)

*Primary Examiner* — Pankaj Kumar
*Assistant Examiner* — Franklin Andramuno

(57) ABSTRACT

The invention relates to a method and system for automatically identifying and presenting video clips or other media to a user at a client device. One embodiment of the invention provides a method for updating a user profile or other persistent data store based on user feedback to improve the identification of video clips or other media content responsive to the user's profile. Embodiments of the invention also provide methods for processing user feedback. Related architectures are also disclosed.

21 Claims, 13 Drawing Sheets

U.S. PATENT DOCUMENTS

| | | | |
|---|---|---|---|
| 5,996,007 | A | 11/1999 | Klug et al. |
| 5,999,985 | A | 12/1999 | Sebestyen |
| 6,038,296 | A | 3/2000 | Brunson et al. |
| 6,061,056 | A | 5/2000 | Menard et al. |
| 6,092,107 | A | 7/2000 | Eleftheriadis et al. |
| 6,098,082 | A | 8/2000 | Gibbon et al. |
| 6,166,735 | A | 12/2000 | Dom et al. |
| 6,188,398 | B1 | 2/2001 | Collins-Rector et al. |
| 6,229,524 | B1 | 5/2001 | Chernock et al. |
| 6,233,389 | B1 | 5/2001 | Barton et al. |
| 6,236,395 | B1 | 5/2001 | Sezan et al. |
| 6,243,676 | B1 | 6/2001 | Witteman |
| 6,282,549 | B1 | 8/2001 | Hoffert et al. |
| 6,289,346 | B1 | 9/2001 | Milewski et al. |
| 6,298,482 | B1 | 10/2001 | Seidman et al. |
| 6,304,898 | B1 | 10/2001 | Shilgi |
| 6,324,338 | B1 | 11/2001 | Wood et al. |
| 6,324,512 | B1 | 11/2001 | Junqua et al. |
| 6,345,279 | B1 | 2/2002 | Li et al. |
| 6,353,825 | B1 | 3/2002 | Ponte |
| 6,363,380 | B1 | 3/2002 | Dimitrova |
| 6,385,306 | B1 | 5/2002 | Baster, Jr. |
| 6,385,619 | B1 | 5/2002 | Eichstaedt et al. |
| 6,389,467 | B1 * | 5/2002 | Eyal ................ 709/223 |
| 6,393,054 | B1 * | 5/2002 | Altunbasak et al. .......... 375/240 |
| 6,411,952 | B1 | 6/2002 | Bharat et al. |
| 6,434,550 | B1 | 8/2002 | Warner et al. |
| 6,453,355 | B1 | 9/2002 | Jones et al. |
| 6,460,075 | B2 | 10/2002 | Krueger et al. |
| 6,477,565 | B1 | 11/2002 | Daswani et al. |
| 6,477,707 | B1 | 11/2002 | King et al. |
| 6,493,688 | B1 * | 12/2002 | Das et al. .................. 706/20 |
| 6,496,857 | B1 | 12/2002 | Dustin et al. |
| 6,507,841 | B2 | 1/2003 | Riverieulx de Varax |
| 6,526,580 | B2 | 2/2003 | Shimomura et al. |
| 6,564,263 | B1 | 5/2003 | Bergman et al. |
| 6,671,715 | B1 | 12/2003 | Langseth et al. |
| 6,678,890 | B1 | 1/2004 | Cai |
| 6,691,954 | B1 | 2/2004 | Harrington et al. |
| 6,751,776 | B1 | 6/2004 | Gong |
| 6,810,526 | B1 | 10/2004 | Menard et al. |
| 6,956,573 | B1 | 10/2005 | Bergen et al. |
| 6,961,954 | B1 | 11/2005 | Maybury et al. |
| 6,970,915 | B1 | 11/2005 | Partovi et al. |
| 7,000,242 | B1 | 2/2006 | Haber |
| 7,006,881 | B1 * | 2/2006 | Hoffberg et al. .............. 700/83 |
| 7,130,790 | B1 | 10/2006 | Flanagan et al. |
| 7,178,107 | B2 * | 2/2007 | Sezan et al. .................. 715/719 |
| 2001/0013123 | A1 | 8/2001 | Freeman et al. |
| 2001/0049826 | A1 | 12/2001 | Wilf |
| 2002/0052747 | A1 | 5/2002 | Sarukkai |
| 2002/0093591 | A1 | 7/2002 | Gong et al. |
| 2002/0100046 | A1 | 7/2002 | Dudkiewicz |
| 2002/0138843 | A1 | 9/2002 | Samaan et al. |
| 2002/0152464 | A1 | 10/2002 | Kitsukawa et al. |
| 2002/0152477 | A1 | 10/2002 | Goodman et al. |
| 2002/0173964 | A1 | 11/2002 | Reich |
| 2004/0117831 | A1 | 6/2004 | Ellis et al. |
| 2005/0028194 | A1 | 2/2005 | Elenbaas et al. |
| 2005/0076357 | A1 | 4/2005 | Fenne |
| 2005/0076378 | A1 | 4/2005 | Omoigui |
| 2005/0223408 | A1 | 10/2005 | Langseth et al. |
| 2005/0278741 | A1 | 12/2005 | Robarts et al. |
| 2007/0079327 | A1 | 4/2007 | Khoo et al. |
| 2008/0120345 | A1 * | 5/2008 | Duncombe ................ 707/104.1 |

OTHER PUBLICATIONS

Shahraray, B. et al., "Multimedia Processing for Advanced Communication. Services", in Multimedia Communications, F. De Natalc & S. Pupolin Editors, pp. 510-523, Springer-Vertag. 1999.

Gibbon, D. "Generating Hypermedia Documents from Transcriptions of Television Programs Using Parallel Text Alignment." in Handbook of Internet and Multimedia Systems and Applications, Borko Furht Editor, CRC Press 1998 Chapter 30.

Huang, Q. et al., "Automated Generation of News Content Hierarchy by Integrating Audio, Video, and Text Information," Proc. IEEE International Conference on Acoustics, Speech and Signal Processing ICASSP '99. pp. 3025-3028, Phoenix, Arizona, May 1999.

Shahraray, B. "Multimedia Information Using Pictorial Transcripts," in Handbook of Multimedia Computing, Borko Furht. Editor, CRC Press 1998.

The FeedRoom web page—http://www.feedroom.com, 1 pg, (Nov. 30, 2001).

Pseudo web page—http://www.pseudo.com, 4 pgs (Nov. 30, 2001).

Medium4.com web page—http://www.medium4.com, 1 pg. (Nov. 30, 2001).

Yahoo finance vision web page—http://vision.yahoo.com. 3 pgs, (Nov. 30, 2001).

"Choosing Your Next Handheld", Handheld Computing Buyer's Guide (Fall 2001), Issue 3.

Raggett, D., "Getting Started with VoiceXML 2.0", http://www.w3.org/Voice/Guide/ pp. 1-4, 6-8, and 10 (Sep. 17, 2002).

Windows Media Player 7 Multimedia File FormaTs web page—http://support.microsoft.com/default.aspx?scid=/support/mediaplayer.wmptest/wmptest.asp, pp. 1-6, Dec. 23, 2002.

* cited by examiner

400 eClips    Your Custom Video Information Service

*Instant clip search:* ~410

[                    ]    *from:* ~415  [ All Sources ▷ ]

( Find & Play )

Use commas to separate search terms (e.g.: Chelsea, Bill Clinton).

*Your eClips profile search for October 30, 2001*

Topics found:           # of clips    Source

AT&T                              8           Custom
Politics                         10           Custom
Jay Lenos White H...              2           Custom
Sports                            6           Custom

~405

[◀                    ▶]

( Play all clips )        ( Add a new topic )
    ~420                         ~425

△ Home    ~430
  Profile  ~435
  Archive  ~440
  Logout   ~445

FIG. 4

FIG. 5 eClips demo's eClips Results
October 30, 2001

Click on a thumbnail to jump to a specific clip.

- 570 View Show
- 575 Send Clips
- 580 Save Clips
- 515 Start at: Politics
- 520 Play: All 510 — UVW NEWS  Monday, October 29, 2002 18:36

505 —
- UVW NEWS  Monday, October 29, 2002 18:36
  "Bush" (23 secs)
  Earlier today, President Bush met with. . . .
- XYZ NEWS  Monday, October 29, 2002 18:08
  "Bush" (20 secs)
  President Bush urged Congress to. . . .

Buttons:
- 525 BACK
- 530 STOP
- 535 PLAY
- 540 SKIP
- 545 TOPIC
- 550 MORE
- 555
- 560 Clear All
- 565 Check All

500

METHOD AND APPARATUS FOR INTERACTIVELY RETRIEVING CONTENT RELATED TO PREVIOUS QUERY RESULTS

CROSS-REFERENCE TO RELATED APPLICATIONS

This application is a continuation-in-part of nonprovisional application Ser. No. 10/163,091 (filed Jun. 6, 2002), which is itself a continuation-in-part of nonprovisional application Ser. No. 10/034,679 (filed Dec. 28, 2001) now abandoned. This application is also a continuation-in-part of nonprovisional application Ser. No. 10/034,679. Nonprovisional application Ser. No. 10/034,679 claims priority to provisional application No. 60/282,204 (filed on Apr. 6, 2001) and to provisional application No. 60/296,436 (filed on Jun. 6, 2001). This application further claims priority to provisional application No. 60/385,915 (filed on Jun. 6, 2002) and to provisional application No. 60/386,392 (filed on Jun. 7, 2002).

Nonprovisional application Ser. Nos. 10/163,091 and 10/034,679, and provisional application Nos. 60/282,204, 60/296,436, 60/385,915, and 60/386,392 are hereby incorporated by reference in their entireties.

BACKGROUND OF THE INVENTION

1. Field of the Invention

The invention relates to the identification and delivery of media assets to a user. More specifically, the invention relates to a method and system for receiving and processing feedback from the user to improve the identification and delivery of subsequent media content to the user.

2. Description of the Related Art

There exists an increasing amount of information available in a variety of media formats from a variety of sources. Known systems and methods for searching video content, for instance, rely on a search of titles or other metadata to identify entire video broadcasts or video files of potential relevance to a user. Once identified, video content is transmitted to the user via conventional methods for distribution of the video source. For example, a content provider manually directs video content to a user over closed circuit television, mails a video tape to a user, or manually generates an electronic mail (email) message with an attached video file.

Known systems and methods for identifying and delivering video or other media content have various disadvantages. For example, since known systems and methods for searching video typically identify entire video broadcasts or video files that are of interest to a user, a user may need to sort through a relatively large volume of irrelevant information to view a relatively small amount of relevant content. In addition, known systems and methods lack a means to monitor and improve the relevance of the transmitted media, except, in some instances, with reference to predetermined categories or hierarchies.

Thus, there exists a need for systems and methods that identify and present media relevant to the interests of a user, and for continually improving the relevance of the identified and presented media.

SUMMARY OF THE INVENTION

The invention relates to a method and system for improving the transmission of media content to a user.

One objective is to improve the identification of video clips or other media content that is responsive to the user's profile.

Accordingly, one embodiment of the invention provides a method for updating a user profile or other persistent data store with information based on prior user feedback. Embodiments of the invention also provide methods for processing user feedback. Related architectures are also disclosed.

The features and advantages of the invention will become apparent from the following drawings and detailed description.

BRIEF DESCRIPTION OF THE DRAWINGS

The invention is described with reference to the accompanying drawings, wherein:

FIG. 4 is an exemplary page view of a page viewed by a user utilizing a client according to one embodiment of the invention;

FIG. 5 demonstrates a page view showing a content retrieval page according to the exemplary embodiment shown in FIG. 4;

DETAILED DESCRIPTION

Figure 1:
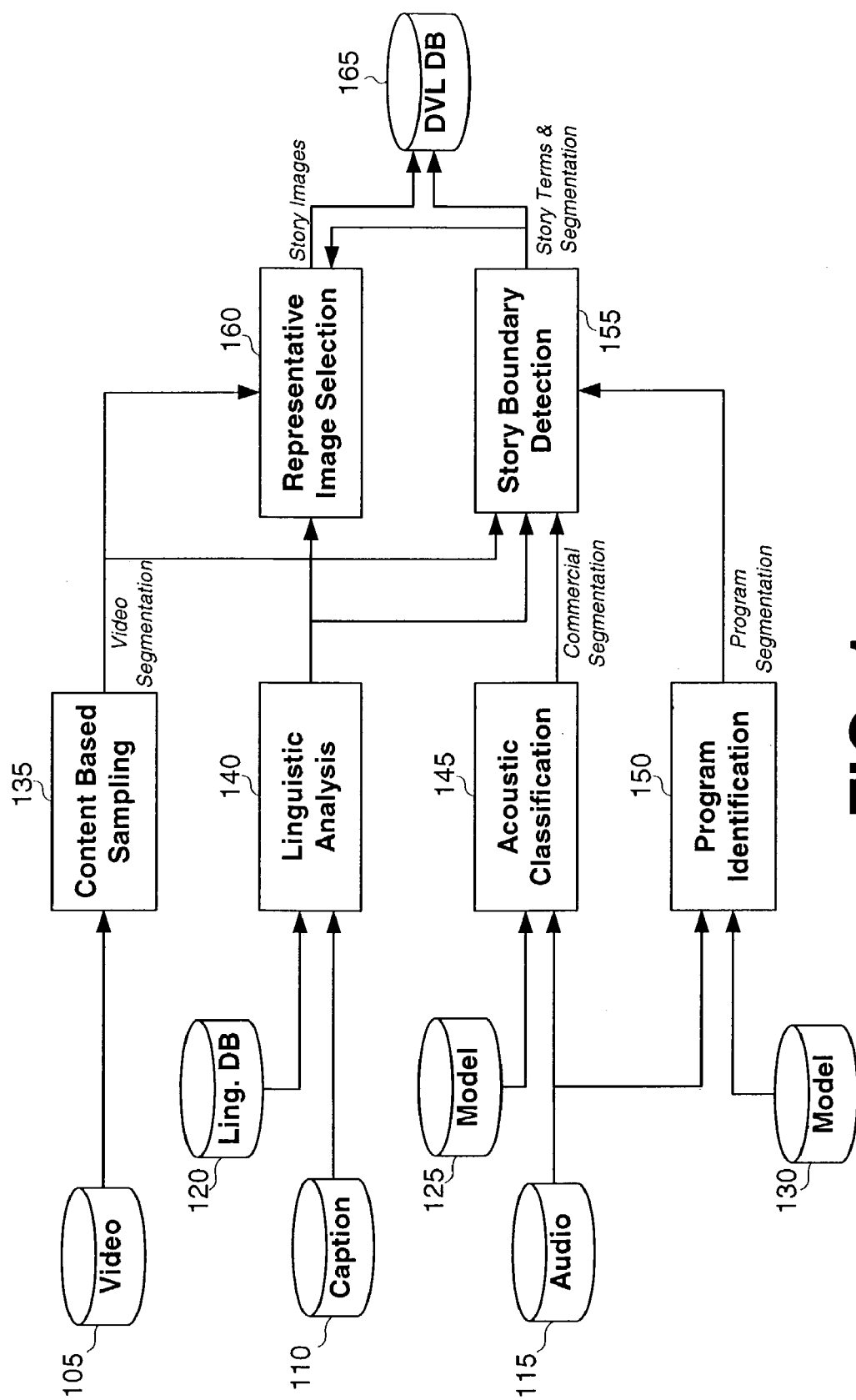
FIG. 1 demonstrates an exemplary methodology for media processing according to one embodiment of the invention.

While the invention is described below with respect to various exemplary embodiments, the invention is not limited to only those embodiments that are disclosed. Other embodiments can be implemented by those skilled in the art without departing from the spirit and scope of the invention. Subheadings used herein are for organizational convenience, and do not limit the disclosure of any particular feature to any particular section of this specification.

The invention solves the above-discussed problems and provides a personalized, customizable multimedia delivery service that is convenient and easy to use. In one embodiment of the invention, the service works by recording all of the video streams of appropriate source and interest to a target audience. For example, the service may record content from a collection of (or a particular one of) sports or news channels on television. In another example, the service may record content related to training videos, presentations or executive meetings in a business, school or other particularized environment. Recording may occur as the content is originally being broadcast (i.e., live), afterwards from recorded media, or even before the content is broadcast to its intended audience.

Once the content is captured and recorded, it can be segmented, analyzed and/or classified, and thereafter stored on a platform. For example, the content can be broken down into its component parts, such as video, audio and/or text. The text can include, for example, closed caption text associated with the original transmission, text generated from an audio portion by speech recognition software, or a transcription of the audio portion created before or after the transmission. In the latter case, it becomes possible to utilize the invention in conjunction with executive speeches, conferences, corporate training, business TV, advertising, and many other sources of video which do not typically have available an associated textual basis for searching the video.

Having obtained or generated the text, it can then be used as a basis for searching the multimedia content. In particular, the text provides the basis for an exemplary methodology for overcoming the above-identified problems associated with searching video in the prior art. That is, if a user wishes to search the stored content for video segments relevant to the President of the United States discussing a particular topic, then the President's name and the associated topic can be searched for within the text associated with the video segments. Whenever the President's name and the associated topic are located, an algorithm can be used to determine which portion of an entire video file actually pertains to the desired content and should therefore be extracted for delivery to the user. Thus, if a video file comprises an entire news broadcast about a number of subjects, the user will receive only those portions of the broadcast, if any, that pertain to the President and the particular topic desired. For example, this could include segments in which the President talks about the topic, or segments in which another talks about the topic and the President's position.

Once the pertinent segments of the broadcast have been appropriately extracted, for a given user, they can be stitched together for continuous delivery to that user. In this way, for example, the segments can be streamed to the user as a means of providing an easy-to-use delivery methodology for the user, and as a means of conserving bandwidth. Users can view the delivered multimedia asset in its entirety, skip between the assets, or view only portions of the assets, as they desire. Moreover, a user can have access to portions of the original video file that occurred immediately before or after the extracted segments; for example, the user could choose to watch the entire original video file. Such access can be granted by including a "more" or "complete" button in a user interface.

In one embodiment of the invention, a profile of the user is stored which specifies criteria for searching available multimedia assets. The criteria may include, for example, key words and/or phrases, a source(s) of the content, etc. The profile can be set directly by the user via interaction with an appropriately designed graphical user interface (GUI). When such a profile is available, the invention is capable of automatically searching the available assets on a periodic basis, and thereafter extracting, combining and delivering the compiled assets (or segments thereof, regardless of their original source) to the user. In one embodiment, the invention can be utilized such that a service platform assisting in implementing the invention notifies the user whenever new multimedia assets consistent with the user's profile have been prepared. In another embodiment, the invention may automatically deliver multimedia assets in accordance with a user's profile according to a predetermined schedule, such as hourly or daily.

Alternatively, the invention may notify the user of the presence of desired video clips, rather than actually deliver those clips.

The assets can be classified and indexed on-the-fly as they are received. In this way, the assets can be compared against the user's profile virtually in real-time, so that results can be provided to the user (and the user can be notified) whenever they become available. Furthermore, a user can provide criteria for a search or searches beyond those set in the user's profile.

The identified assets can be delivered to the user in a variety of manners. For example, delivery may occur via cable or satellite television, or directly to a personal computer. The invention can be practiced via a plurality of platforms and networks. For example, the invention may be practiced over the Internet to reach a large consumer audience, or it may be practiced over an Intranet to reach a highly targeted business or industry target.

In one embodiment, the invention allows video streaming of identified video clips. Video streaming (i.e., allowing the viewing of a video clip as it is downloaded rather than only after it is downloaded, which speeds the viewing process and largely obviates the need for video storage at the user location) is a communications technique that is growing in popularity with the increasing availability of both video players (especially for use with personal computers) and bandwidth to the average consumer. However, no conventional service allows users to accurately and quickly find desired clips for playing, and do not provide a ready means for providers to profit from the video streams that are provided.

When streaming the identified video clips, users may receive only those video clips identified by a search executed on the user's behalf. However, if a user desires, he or she may also choose to view an entire program from which the clip(s) was extracted. A user may also be allowed to choose some or all of the video clips for long-term storage, whereby the clip(s) can be archived for later use. In one embodiment, the user may store the clips at a local computer, and thereafter make the clips available to other users connected via a peer-to-peer network.

In another embodiment, the invention allows improved video-on-demand (VOD). VOD is typically defined in the cable/satellite television arena as the ability to request programming at any time and to have VCR-like controls over the content being streamed to the TV. The invention adds value to conventional VOD by allowing the user to demand video more accurately and completely.

An extension to VOD is personal video recorder (PVR) technology, which allows even more control over TV programs being viewed. Current PVR implementations are offered by TiVo and ReplayTV, and allow users great flexibility in storing programs for later viewing and/or manipulation in viewing (e.g., skipping over commercials in a television program). The invention provides a searching tool for allowing users to find interesting programs, even from a variety of channel sources, to thereafter be recorded and viewed using PVR technology.

Moreover, whereas conventional PVR records only entire programs based on a user's directions, the invention permits the recording of only those portions of programs that the user desires. In this regard, the invention contemplates recording the desired portions either by doing so directly from the program, or by recording the entire program locally and then utilizing only those portions of the program desired by the user.

Having described various exemplary embodiments of the invention, it should be noted that the terms "video file,"

"video input," "video," "video program" or any similar term refers generically to any analog or digital video information, including any content associated therewith, such as multimedia content, closed caption text, etc. The terms "clip," "video clip," "electronic clip" or "eClip" should be understood to refer to any subsection of a video program that is selected based on a user search criterion. Also, the terms "extracting," "parsing," "removing," "accessing" or any similar term with respect to a video file refers to the use of a selected portion of the video file. Such use may include literal removal (permanent or temporary) from the context of a larger file, copying of the selected portion for external use, or any other method for utilizing the selected portion. The term "media clip" is more general than video clip, referring to any portion of a media presentation. For example, a portion of an audio file (i.e., an audio clip) is also properly referred to as a media clip. Video clips and image sequences are also media clips.

Based on the above-described features of the invention, a user may accurately, completely and promptly receive multimedia assets that he or she finds interesting, and may conveniently exploit the received assets in a manner best-suited to that user.

FIG. 1 demonstrates an exemplary methodology for media processing in a digital video library (DVL) according to one embodiment of the invention. Such media processing is used in implementing the invention at a user level, by capturing, segmenting and classifying multimedia assets for later use and manipulation. It should be noted that the media processing implementation of FIG. 1 and discussion of associated concepts are provided in greater detail in the following documents, which are hereby incorporated herein by reference: Shahraray B., "Scene Change Detection and Content-Based Sampling of Video Sequences," Proc. SPIE 2419, *Digital Video Compression: Algorithms and Technologies*, pp. 2-13, February 1995; Shahraray B., Cox R., Haskell B., LeCun Y., Rabiner L., "Multimedia Processing for Advanced Communications Services", in *Multimedia Communications*, F. De Natale and S. Pupolin Editors, pp. 510-523, Springer-Verlag, 1999; Gibbon D., "Generating Hypermedia Documents from Transcriptions of Television Programs Using Parallel Text Alignment," in *Handbook of Internet and Multimedia Systems and Applications*, Borko Furht Editor, CRC Press 1998; Shahraray B. "Multimedia Information Retrieval Using Pictorial Transcripts," in *Handbook of Multimedia Computing*, Borko Furht Editor, CRC Press 1998; and Huang Q., Liu Z., Rosenberg A., Gibbon D., Shahraray B., "Automated Generation of News Content Hierarchy By Integrating Audio, Video, and Text Information," Proc. IEEE International Conference On Acoustics, Speech, and Signal Processing ICASSP'99, pp. 3025-3028, Phoenix; Ariz., May 1999.

In FIG. 1, multimedia assets including video 105, associated text captions 110 and corresponding audio portions 115 are imported into the system for processing. Content-based sampling engine 135 receives the video 105 and segments it into individual shots or video frames; this information will be combined with information extracted from the other components of the video program to enable the extraction of individual stories (i.e., video segments related to a particular topic or topics), as will be described. Additionally, this process allows a representative image for a particular story, segment or clip to be selected by engine 160; and second, the process allows boundaries around the story, segment or clip to be set by engine 155.

A database 120 of linguistic rules is used by linguistic analysis engine 140 to combine the caption information 110 with the segmented video within engines 155 and 160, to thereby assist in the functionality of those two engines. Similarly, information within model databases 125 and 130 is used by acoustic classification engine 145 and program identification engine 150 to provide segmentation/identification of commercials and programs, respectively. Once the multimedia asset(s) have been captured, segmented and classified as described above, they can be stored thereafter in DVL database 165.

All of the information from engines 135-150 is utilized in engines 155 and 160 to discern a length of a particular video story or clip that will be associated with each topic. In particular, for example, multimodal story segmentation algorithms such as those described in "Automated Generation of News Content Hierarchy By Integrating Audio, Video, and Text Information" (above) can be used to determine an appropriate length of a video clip to be associated with a particular topic. Similarly, the algorithm can be used in conjunction with the user profile to either compare the profile information to newly-acquired content on-the-fly, or to similarly determine an appropriate length for a video clip to be associated with a particular portion of the user profile.

As referred to above, textual information used to identify clips of interest can be derived, for example, from closed caption text that accompanies most television programs. Real-time closed captioning typically lags behind the audio and video by a variable amount of time from about 1 to 10 seconds. To take this factor into account, the embodiment of FIG. 1 is capable of using speech processing to generate very accurate word timestamps.

When closed caption text is not available, a large vocabulary automatic speech recognition system can be used to generate a transcript of the audio track. While the accuracy of the automatically generated transcripts is below that of closed captions, they provide a reasonable alternative for identifying clips of interest with reduced, but acceptable, accuracy. Alternatively, a parallel text alignment algorithm can be used to import high quality off-line transcripts of the program when they are or become available.

Figure 2:
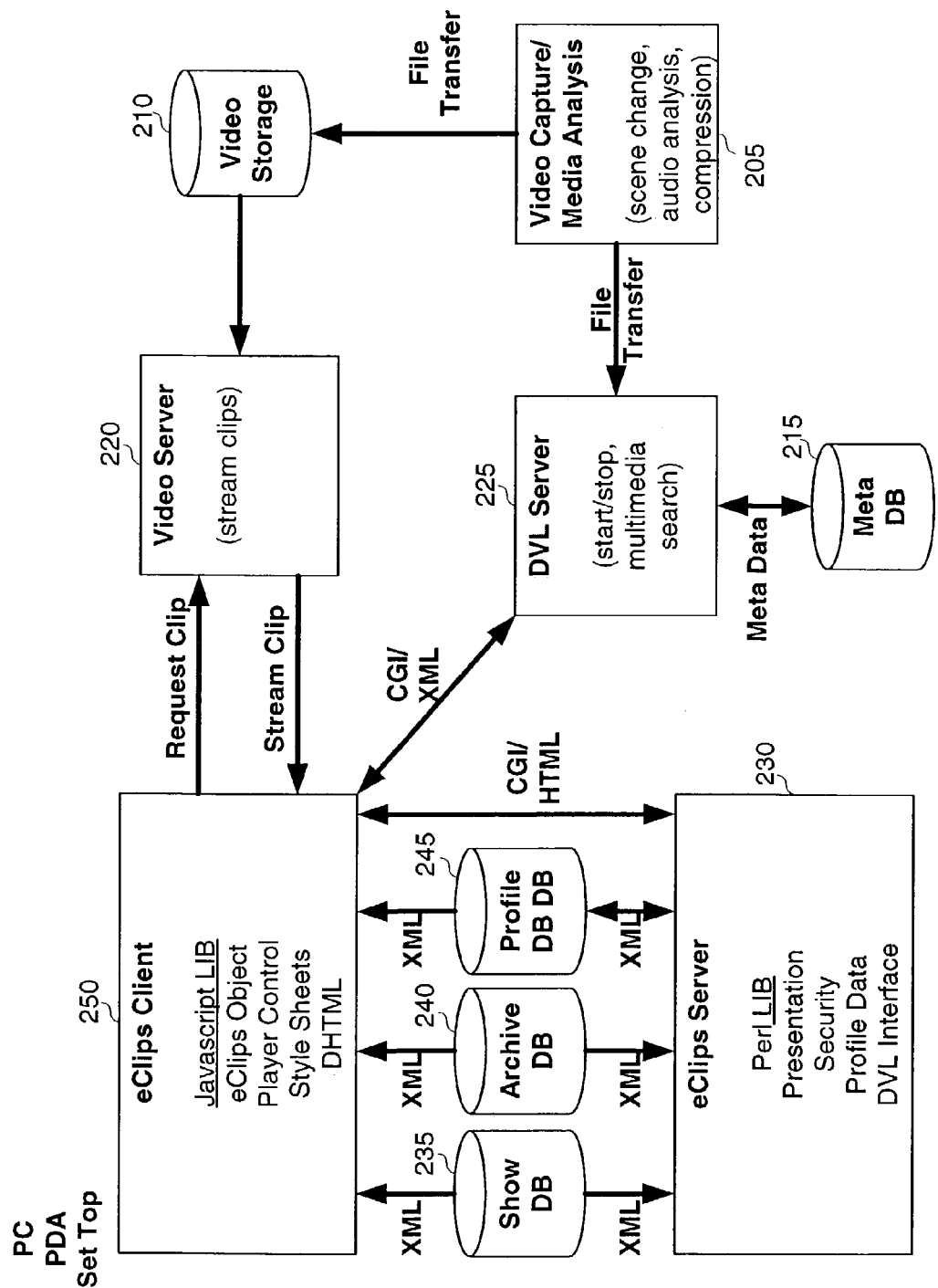
FIG. 2 illustrates an architecture for implementing an exemplary embodiment of the invention.

FIG. 2 implements an architecture for implementing an exemplary embodiment of the invention. It should be noted that the architectural elements discussed below can be deployed to a user and/or provider of multimedia assets in whole or in part, and therefore each element interfaces with one another and external components using standard, conventional interfaces.

In FIG. 2, Video Capture/Media Analysis component 205 records and compresses broadcast TV programming. Also at component 205, various functions can be performed on the content such as scene change detection, audio analysis, and compression. These video files are shipped to the Video Storage database 210 from which they will be served when the video is streamed to the client 250.

Associated metadata is shipped to the Metadata database 215. Note that thumbnail images are included as part of the metadata, as well as terms and/or phrases associated with a clip(s) for categorizing the clip(s) within a topical subset. Typically, this video capture/media analysis process need not occur in real time. However, there is no reason why it could not occur in real time if an operator so desires and wishes to devote sufficient computational resources. In any case, it is not necessary to wait until a show is completed before indexing and searching that show.

Video Server 220 responds to clip requests and makes the video content available to the client 250. For example, the video server 220 may download the video clips in whole or in part, stream the clips (e.g., via MPEG4 ASF or MPEG2) to the client 250 or generate the clip metadata discussed above (such as terms and/or phrases associated with a clip for categorizing the clip within a topical subset).

DVL Server 225 handles query requests (such as how many clips are available, which shows have clips, etc.) and/or clip content requests (metadata that describes clip content including "clip pointer" to video content). Thus, it handles multimedia search (such as closed caption text) and determines the start and stop times of the clips, which are designated with "clip pointers," as just mentioned.

eClips server 230 handles client requests for web pages related to a service for providing eClips. eClips server 230 utilizes Perl Common Gateway Interface (CGI) scripts that the client navigates in order to perform the functions of the eClips service. For example, the scripts deal with login/registration related pages, home page, profile related pages, archive related pages, player pages, and administration related pages. Player scripts can be launched in a separate window. Each CGI request from the client 250 will return HTML with HTML DIVs, JavaScript, and CSS style sheets. The DIVs and CSS style sheets are used to position the various elements of the page. DHTML is used to dynamically load DIV content on the fly (for instance, a list of shows in an instant search pull down performed by a user).

In FIG. 2, three databases 235, 240 and 245 are shown as Extensible Markup Language (XML) databases. Thus, Perl scripts can be utilized to access (i.e., read from and/or write to) these databases via XML. Specifically, these three databases include show database 235, which contains information about recorded broadcasts, Profile database 245, which contains personal search terms and/or phrases, and Archive database 240, which contains saved clip information (e.g., entire clips or simply clip pointers).

eClips Client 250, in one embodiment, includes a JavaScript that each Perl script includes in the HTML that is returned from the eClips server 230. It is through the JavaScript that the client 250 interacts with the DVL server 225 to determine the desired content and through JavaScript that the client initiates the streaming content with the video server 220. The JavaScript also accesses (reads) the Show and Profile XML files in those databases.

The Video Server 220 may have a separate IP host name, and should support HTTP streaming. The DVL and eClips servers 225 and 230 may have the same IP host name, and may be collocated within a single machine.

In FIG. 2, the key interactions that cause video to be streamed to the client 250 are demonstrated. In a home page view, a user has logged in already and should see a list of topics determined by their profile, as well as the number of clips for each topic. An example of a topic could be "sports" and the keyword string associated with this topic could be football, baseball, hockey. The keyword string is used to search the CC text (in this case, clips that have any of these terms will be valid).

When the home page is loaded, JavaScript will send a CGI query to DVL server 225, which generates an XML response. The XML is parsed into JavaScript variables on the client using the XML document object model (DOM). The CGI query and XML response is implemented as part of the DVL system and acts as a layer above an Index Server, which, as part of the DVL server 225, performs text indexing of the video clips (as discussed above) that allows the user to locate a desired clip. The XML response will include the number of clips found for each topic. It is with these query responses that the home page knows which topics have hits and can activate the links to play the content.

These JavaScript links, when clicked, can launch the player page in a separate window. When the player page is loaded, essentially the same JavaScript can be used to recalculate the number of clips for each topic. In principle, this could be changed to calculate this only once and to pass this on to the player script thereafter. The JavaScript may also run a query to get the list of shows with clips for a particular topic. The JavaScript then loops through all the shows with hits and queries the DVL server via the separate CGI script to get the clip information needed to play the clip. This information is also returned via XML and parsed via the JavaScript. The JavaScript loads various DIVs that depend on this information, such as hit search term found in CC text, CC text, and thumbnail. Finally, the player page JavaScript starts the media player with the first clip using a pointer (start time) to the video. It should be noted that, in one embodiment of the invention, the just-described process is almost completely automated, so that dynamic clip extraction occurs when a clip is selected, and a show automatically starts and will play completely through if not interrupted by the user.

In the architecture shown in FIG. 2, eClips client 250 may reside on, for example, a user's home or business computer, a personal digital assistant (PDA), or a set-top box on a user's television set. Client 250 interacts with eClips server 230 as discussed above to provide the user with an interface for viewing and utilizing the video clips. Client 250 can be written to contain, for example, a JavaScript object that contains profile results (eClips object). A user using eClips client 250 running on a PC may access stored clips through a network, such as the Internet or a locally defined Intranet.

In one embodiment, the user defines a search criterion, either through an "instant search" feature or within a user profile. When multiple clips are found matching the user search, the clips can be stitched together and streamed to the user as one continuous program. In another embodiment, eClips server periodically searches for clips matching a given user's profile, and makes the clips available to the user, perhaps by notifying the user via email of the availability of the clips.

The architecture shown in FIG. 2 allows for video to be stored and displayed in several formats including MPEG2 (e.g., for digital television and video on demand) and MPEG4 (e.g., for streaming video on the Internet). As mentioned above, the video may be stored for later use by the user; in particular, a user may archive some or all of the received video and thereafter permit searching and uploading of the video from storage by other members of a peer-to-peer computer network.

Figure 3:
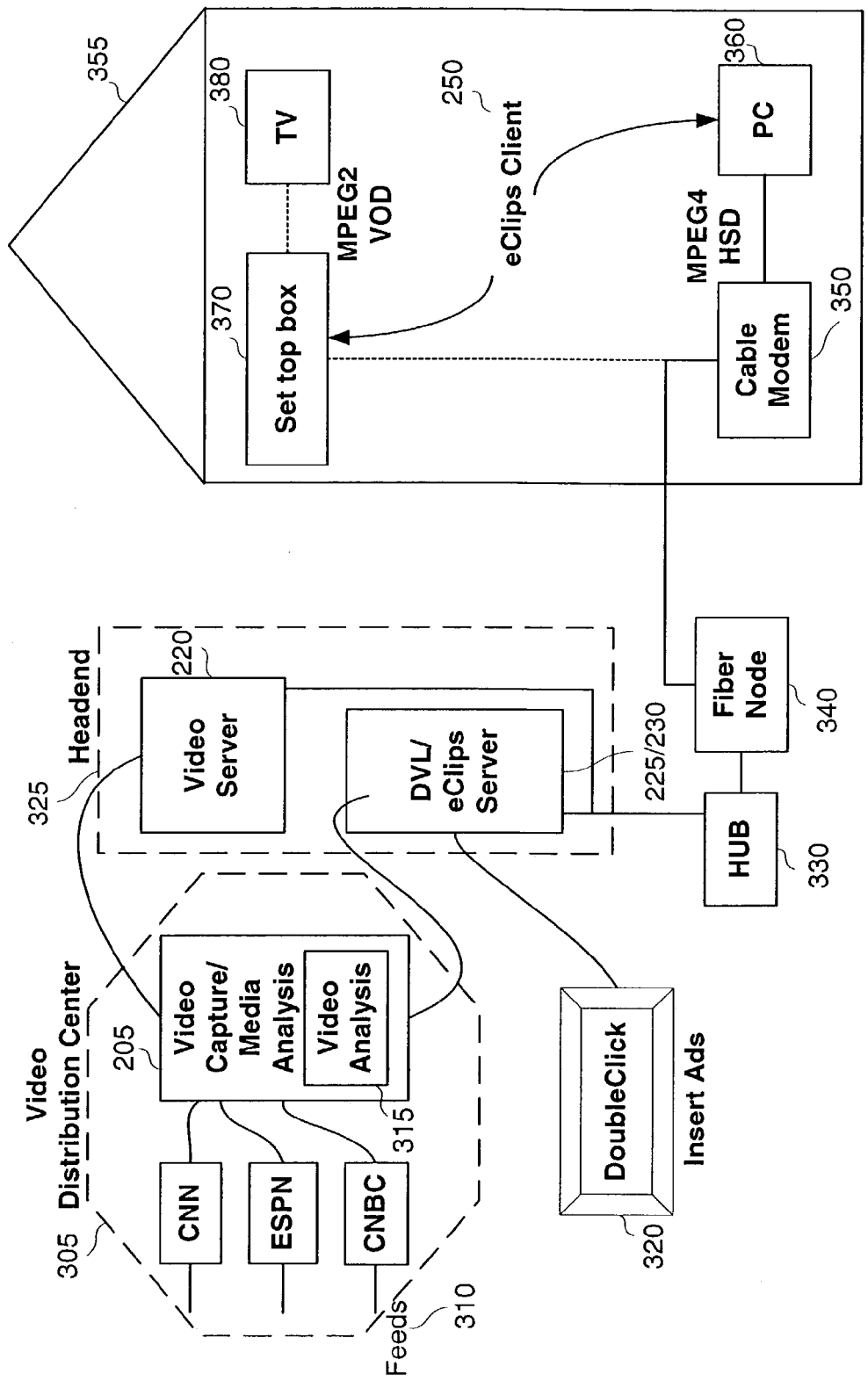
FIG. 3 demonstrates a more specific hardware architecture according to another exemplary embodiment of the invention.

FIG. 3 demonstrates a more specific hardware architecture according to another exemplary embodiment of the invention. In FIG. 3, video feeds 310 are received through various sources (such as television channels CNN, ESPN and CNBC) at Video Capture/Media Analysis component 205 within Video Distribution Center 305. Component 205 receives the feeds and forwards captured/analyzed results to video server 220 and/or DVL/eClips server 225/230 within cable Headend 325. In FIG. 3, video analysis portion 315 is illustrated within component 205, although it should be understood from FIG. 2 and the associated discussion above that component 205 may perform other media analysis such as audio analysis. The DVL/eClips servers 225/230 operate as described above in conjunction with FIG. 2 to deliver, using, for example, Hybrid Fiber Coaxial (HFC) connections, all or part of the video feeds to routing hub 330, and then through fiber node 340 to cable modem 350 located within user home 355. Additional marketing and advertising (such as a commercial placed between every third clip stitched together) could be tied into the video stream in one embodiment of the invention at the Headend from providers 320 such as DoubleClick.

Within user home 355 the feed is received at cable modem 350 via high speed data line (HSD) to a PC 360 running eClips client 250. Alternatively, the feed could be sent to Set top box 370 atop TV 380, where Set top box 370 runs eClips client 250. In the example where the video clips are received via cable modem 350, the service can be streamed as high speed data (HSD) through a cable modem as MPEG4 video. When the video is received via Set top box 370, it can be delivered as MPEG2 over video on demand (VOD) channels that could be set up in advance for a service providing the invention.

FIG. 4 is an exemplary page view of a page viewed by a user utilizing an eClips client according to one embodiment of the invention. In FIG. 4, for example, the user might see page view 400 just after logging in to a system implementing the invention. In page view 400, section 405 demonstrates the results of a profile search performed for the user on a given day, or over some other pre-defined period, according to the previously stored profile of that user. In section 405, clips are listed both by topic and by number of clips related to that topic. In section 405, the user therefore has the option of viewing one or more of the clips related to a particular topic.

Section 405 also identifies a source for the criteria used to select the various topical clips. More specifically, on a profile page, a user can select default sources (shows) which will be searched based on the user's profile; this is referred to as a "Main" list, and would restrict any profile topic that has the Main option to search only those shows selected on the profile page. On a topic editor page, where a user is allowed to add or modify topics for searching, the user can specify this Main list, or can make Custom selections that are only valid for a particular search topic. In section 405, the user has selected the latter option, and so a "source" is shown as Custom.

In section 410, the user additionally has the option of entering new search terms and/or phrases not related to his or her current profile, whereby the invention searches a clips database via DVL server as described above with respect to FIG. 2. Section 415 indicates the media sources which will be searched for the terms or phrases entered in section 410.

Also, in page view 400, button 420, "Play all clips," allows a user to view all currently available clips with one click. The user can add a new topic using button 425. The user can return to a home page by clicking on button 430 (although this option is only valid when the user is on a page different from the home page 400 itself), access his profile via button 435 and access an archive of previously saved clips via button 440. Finally, a user can log out of the service using button 445.

FIG. 5 demonstrates a page view 500 showing a content retrieval page according to the exemplary embodiment shown in FIG. 4. In section 505, still frames of the beginning of each clip (i.e., thumbnails) within a topic can be viewed by the user. Section 505 can be controlled by section 515, which allows the user to select a topic of clips to be shown, as well as section 520, which allows a user to select a portion of the clips from that topic that will be played. With buttons 560 and 565, a user may clear or select all of the clips being shown within a particular topic.

When one or more of these clips is chosen for viewing by the user, that clip is shown in section 510. Section 510 can be controlled by buttons 525-550, which allow a user to skip to a previous clip with button 525, stop the clip with button 530, play the clip with button 535, skip the clip with button 540, switch to a new topic of clips with button 545 or view footage after the selected clip(s) with button 550. Note that section 510 may also include advertisements 555, and may display a time remaining for a currently playing clip, a source of the clip, and a date and time the clip was originally broadcast.

In one exemplary embodiment of the invention, page 500 will play all of the clips currently available in a predetermined order (e.g., reverse chronological order, by source of content, etc.) if the user does not choose a specific topic or clip. Button 570 is activated when a user wants to view the clip(s) available; i.e., as shown in view 500. Button 575 allows the user to send (e.g., email) the clip(s) to another user, and button 580 allows the user to save the clip(s) to an archive (i.e., the archive accessed by button 440 in FIG. 4).

Having discussed various exemplary embodiments of the invention and associated features thereof, as well as potential uses of the invention, the following provides a more detailed summary of application categories in which the invention is of use.

Generally speaking, because the invention can capture content from nearly any multimedia source and then use standard streaming media to deliver the appropriate associated clips, it is nearly limitless in the markets and industries that it can support.

As a practical matter, the invention can be packaged to address different market segments. Therefore, it should be assumed that the target markets and applications supported could fall into, for example, any or all of the Consumer, Business-to-Consumer or Business-to-Business Marketplaces. The following discussion summarizes some exemplary application categories.

First, as a consumer offering, the invention can be provided as an extension to standard television programming. In this model, an ISP, Cable Programming Provider, Web Portal Provider, etc., may allow consumers to sign up for this service, or the set of features provided by the invention can be provided as a premium subscription.

In the consumer service model, a consumer would enter a set of keywords and/or phrases in the profile. In addition, as part of the preferences selected in the profile the user may determine that only specific content sources should be monitored. As the user profile is created or changed it would be updated in the user profile database. As video content is captured in the system, the user profile database is matched against the closed caption text. As an example, a consumer may be interested in sports but only want to see the specific "play of the day." In this scenario, the consumer would enter the key words "play of the day" and then identify in the profile the specific content sources (channels or programs) that should be recorded/analyzed by the invention. For example, the consumer could choose channels that play sports games or report on sports news. When the consumer returns from work that evening, a site or channel for accessing the invention would be accessed. This consumer would then see all of the clips of programs that matched the keywords "play of the day," meaning that this consumer would see in one session all of the content and clips matching that set of words.

As another example, in a Business-to-Consumer offering, the invention can be provided as an extension to standard television programming. In this case, both the programming and its sponsorship would be different from the consumer model above. For example, a corporate sponsor or numerous corporate sponsors may offer specific types of content, or may offer an assemblage of content overlaid with advertising sponsorship. The sponsorship would be evident in the advertising that would be embedded in the player or in the content, since the design of the invention is modular in design and allows for customization.

In the Business-to-Consumer service model, a consumer would enter a set of keywords in the profile. As the user profile is created or changed it would be updated in the user profile database. Because this model and the content provided would be underwritten by corporate sponsorship, the content provided may be limited to a proprietary set of content. As an example, if CNN were the sponsor of the service, all of the content provided may be limited to CNN's own broadcasts. In addition, it may be very evident to the consumer that the service is brought to them by CNN in that the CNN logo may be embedded in the user interface, or may be embedded in the content itself.

Next, as a Business-to-Business offering, the invention can be used in intra-company applications as well as extra-company applications. The applications supported include, as just a few examples: Business TV, Advertising, Executive Announcements, Financial News, Training, Competitive Information Services, Industry Conferences, etc. In essence, the invention can be used as a tool to assist employees in retrieving and viewing specific portions of content on demand.

In this Business-to-Business service model, a user would enter a set of keywords in the profile that would be updated in the user profile database. In this case, the content captured will be dependent upon the business audience using the service.

In an intra-business application, the user may wish to combine sources from within the business and sources outside of the business. As an example a user may wish to see all clips dealing with the category "Virtual Private Networks." In this example, a business may have planned a new advertising campaign talking about "Virtual Private Networks" and have an advertisement available to its internal personnel. At the same time, there may be an internal training class that has been recorded and is available internally in which a section talks about "Virtual Private Networks." Again, this could be another content option captured by the invention. Also, one of this company's competitors may have provided a talk at an industry conference the day before about their solution for the "Virtual Private Network" area. As with the other content options, this too could be captured and available as a content option through the invention. Therefore, when our user begins a session using the invention and looks under the term "Virtual Private Networks," there could be numerous clips available from multiple sources (internal and external) to provide this user with a complete multimedia view of "Virtual Private Networks".

As an extra-business tool, the invention can provide businesses, their suppliers, their best customers, and all other members of communities of interests with specific targeted content clips that strengthen the relationships. These may include (but not be limited to) product details, new announcements, public relations messages, etc.

As further examples of applications of the invention, the following represent industry applications which may benefit from use of the invention.

In the financial industry, financial information can be available for both professionals and potential clients to receive late-breaking information on stocks, companies and the global markets. The information can be from a variety of sources such as Financial News Network, Bloomberg, CNN, etc. and allow users to identify key areas of interest and to continually be up to date.

In the advertising/announcements industry, advertisers would be able to target their ads to consumers based on peoples' preferences as expressed in their profiles. This is potentially a win/win situation because people would not be getting any more ads but they would be seeing more things that interest them. Advertisers could charge more for this targeted approach and thereby pay for any costs associated with the invention.

Similarly, large companies run TV advertisements for a multitude of products, services, target markets, etc. These companies could benefit by housing these commercials on an on-line database that can be accessible to their marketing staff, the advertising agencies, and clients interested in seeing particular commercials that used specific words or product names. The invention can then allow these commercials to be easily searched and accessed.

In the entertainment industry, the movie industry can use the invention to easily scan through archives of old and new movie footage that can be digitized and stored in a central repository. Sports highlights can be made available for particular games or events. Networks could maintain a library of indexed TV shows (e.g., PBS) where users can search for a particular episode/topic.

In the travel industry, searches can be done on new information in the travel industry such as airlines, causes of delays, etc. In addition, the invention can be used to provide key clips from specific resorts and other potential vacation destinations.

In the distance learning/education industry, a large variety of courses could be stored on-line. In many circumstances, a user may want to only see the salient points on a specific topic of interest. The invention can then play a key role in providing support to the user for access and retrieval of the key needed information.

For conferences and trade events, the invention can be an information dissemination tool for finding the latest information quickly when videos are captured of talks and demonstrations in key events.

In one embodiment of the invention, the relevance of subsequent media is improved based on feedback from the user. Exemplary implementations are discussed with reference to FIGS. 6-13 below. Although the following description is with respect to the delivery of video clips, the same or similar process could be implemented for audio clips, sequenced images, and/or other media clips or media content as an alternative to, or in combination with, video clips.

Relevance Feedback Processing Overview

Figure 6:
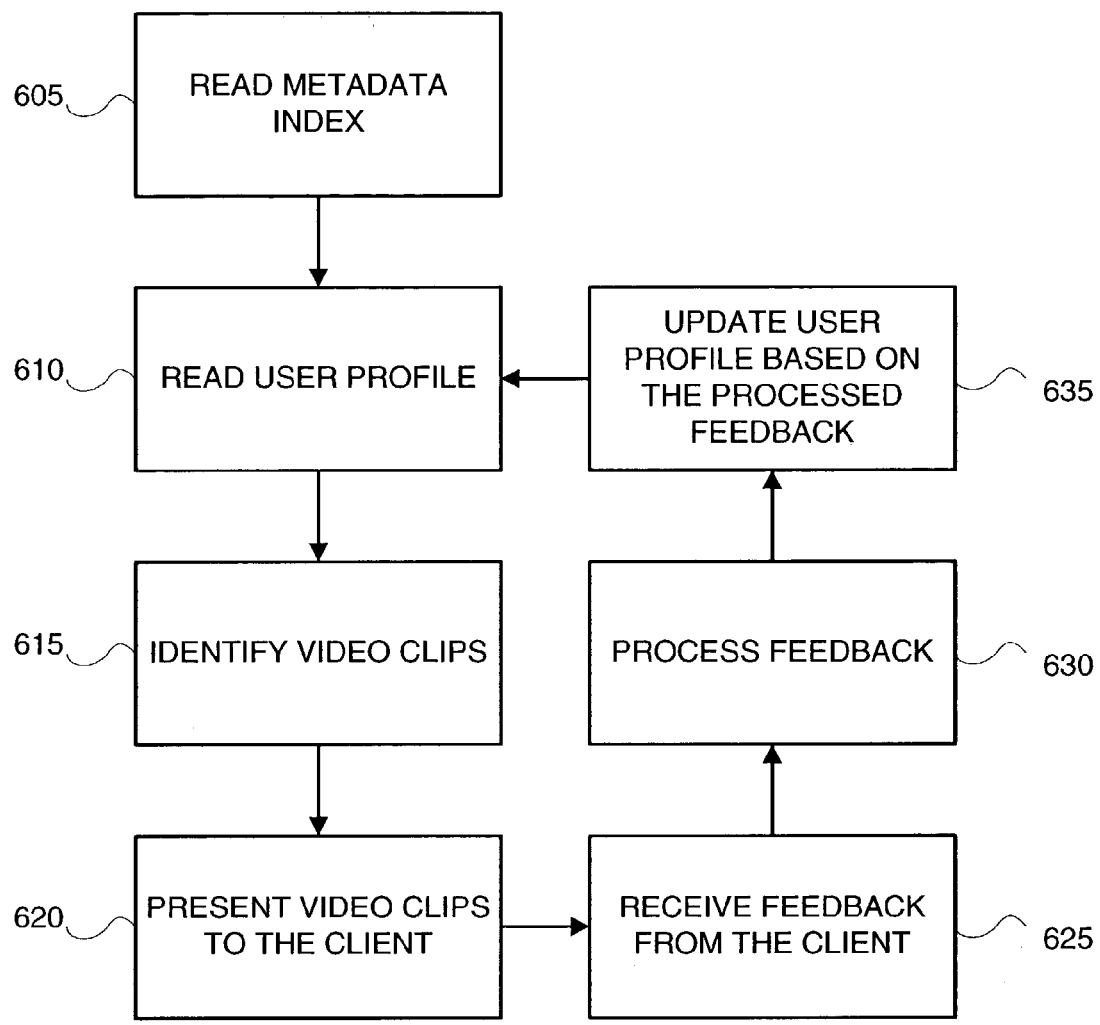
FIG. 6 is a flow diagram for transmitting media and processing feedback related to the media, according to one embodiment of the invention.

FIG. 6 is a flow diagram for transmitting media and processing feedback related to the media, according to one embodiment of the invention. As shown therein, the process begins in step 605 by reading a Metadata index having, for example, title, keywords, or other Metadata related to video clips or other media content. In step 610, the process reads a predetermined user profile describing subject matter relevant to the interest(s) of a user. In step 615, the process identifies appropriate video clips, for example, by comparing the user profile to the metadata index. In step 620, access to the identified video clips are provided to a user, for example at a client device. The video clips can be presented as one or more hypertext links in a menu, as thumbnails, video thumbscreens, video files, metafiles, or other format(s) appropriate to the type of client device receiving them. A user can view video clips, for example, by using a media player resident on the client device. Moreover, video clips may be viewed together with closed captioned text (CCT) or other text. Feedback is received in step 625 according to user input and/or as a result of user actions taken in response to the presented video clips. Feedback processing step 630 produces keywords and/or other information based on the received feedback, and the user profile is updated in step 635 based on the produced keywords and/or other information. Step 635 also contemplates that, in some embodiments, keywords related to negative feedback can be deleted from the user profile.

Accordingly, when steps 610 and 615 are repeated, the process determines more relevant video clips based on the user feedback.

In operation, the process depicted in FIG. 6 can be repeated many times to increasingly tailor each subsequent search according to user feedback. Moreover, portions of the process depicted in FIG. 6 may be iterated. For example, receiving step 625 and processing step 630 may be repeated for each of several video clips before updating the user profile in step 635. In addition, the process of FIG. 6 can be operated according to various time frames. For example, upon receiving feedback from the client in step 625, the system can be configured to automatically perform steps 630, 635, 610, 615, and 620 to present the user with a next set of video clips or other media in an effort to provide content that is more relevant to the user's topical interest. In the alternative, or in combination, subsequent searches can be launched at predetermined times or at predetermined time intervals (e.g., minutes, hours, days, months, or years) subsequent to an initial search. In the alternative, or in combination, subsequent searches can be launched in response to user demand.

Although the output of processing step 630 is variously described herein as being one or more keywords, alternative embodiments of processing step 630 output other information such as program title, images, sounds, date/time stamp, a user feedback parameter (such a as a positive or negative indication) and/or other information in the alternative or in combination with keywords to update information in the user profile.

In a variation of the process depicted in FIG. 6, step 635 is replaced by storing (and/or deleting) keywords and/or other information in a persistent data store, and step 615 determines new video clips or other media content based on the user profile, the keywords and/or other information in the persistent data store, and the metadata index.

Portions of the relevance feedback process illustrated in FIG. 6 are detailed below.

Receiving Feedback

Feedback is received from the user (client) in step 625. In a first embodiment of step 625, the feedback includes user-selected text. The selection is made, for instance, by using click-and-drag techniques, or by selecting hyper-linked text. In a second embodiment of step 625, a user provides a rating, ranking, or other relevance weighting for one or more of the presented video clips. In a third embodiment of step 625, the feedback includes information about user actions performed in response to the presented video clips. For instance, the feedback may be the fact that a user: selected a video clip; viewed X % of a video clip; replayed a video clip; stored a video clip; forwarded a video clip via email; skipped a video clip; and/or fast-forwarded through at least a portion of a video clip. The feedback may also include the date and/or time that a user viewed a video clip, and/or the source of a video clip that a user selected. The three embodiments of step 625 may be used in the alternative or in any combination. As indicated above, after feedback is received, the feedback is processed to generate keywords and/or other information.

Processing Feedback

Figure 7:
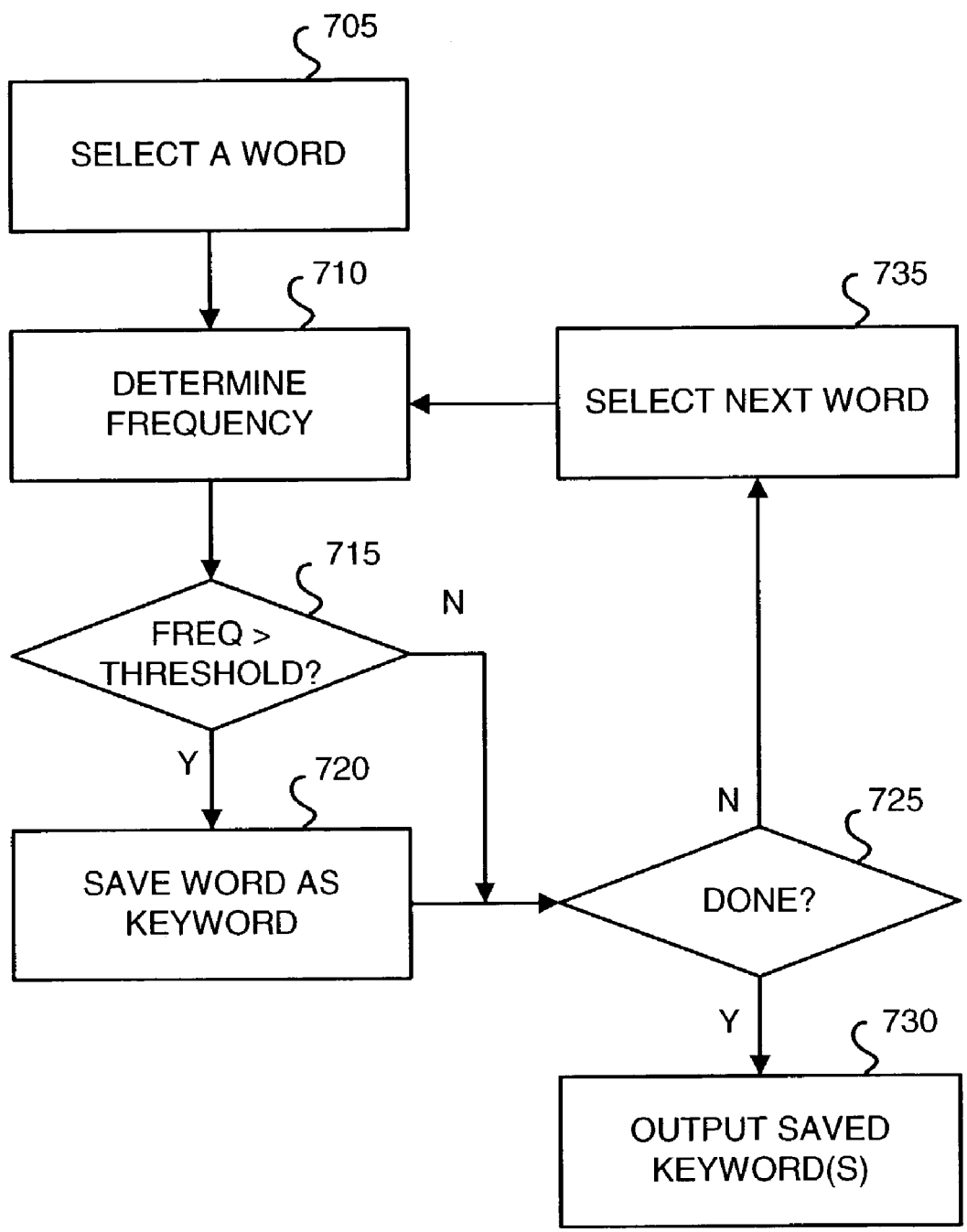
FIG. 7 is a flow diagram for processing feedback from a client, according to one embodiment of the invention.

FIG. 7 is a flow diagram for processing feedback from a client, according to a first embodiment of step 630, which is related to the first embodiment of step 625. As shown therein, the process begins by selecting a first word from user-selected text in step 705. Then, in step 710, the process determines a frequency for the selected word. Step 710 can include counting the number of instances of the selected word in the user-selected text.

In the alternative, step 710 may include counting all instances of the selected word, or any variation thereof, in the video clip. For example, where a video clip includes CCT, and where the user has selected the phrase "java beans is a interesting technology," the process may first select the word "java" in step 705, then look for all instances of java (selected or not) that appear in the CCT in step 710. The result of step 710 is a frequency (total count) of the selected word in the subject media.

In one embodiment of step 710, the frequency is adjusted based on the normal occurrence of the word in the native language. For example, if the word "java" normally occurs once in every 10,000 words in English literature, the word "beans" normally occurs once in every 5,000 words in English literature, and both "java" and "beans" appear five times in the CCT associated with the selected video clip, then step 710 may adjust the frequency for "java" to be twice that of "beans."

The frequency is then compared to a predetermined frequency threshold in conditional step 715. If the output of conditional step 715 is positive, then the word is saved as a keyword in step 720. Note that if the predetermined frequency threshold is 0, then all selected words are saved as keywords in step 720. If the output of conditional step 715 is negative, or upon the completion of saving step 720, then the process advances to conditional step 725 to determine whether all words have been processed. If not, then the process continues at step 735 by selecting a next word and returning to step 710. Otherwise, the process terminates in step 730 by outputting all saved keywords. Thus, words included in user-selected text that appear more frequently in the selected text (or in the media being viewed) than they appear in the native language can be output as keywords from feedback processing step 630.

The process illustrated in FIG. 7 and described above may be most applicable to instances where a user has selected a paragraph of text, and least applicable to instances where a user has selected a single word or phrase. Indeed, where a user has selected a single word or phrase in feedback step 625, it may be preferable to pass the user selection directly to update step 635 without intermediate processing in step 630.

Figure 8:
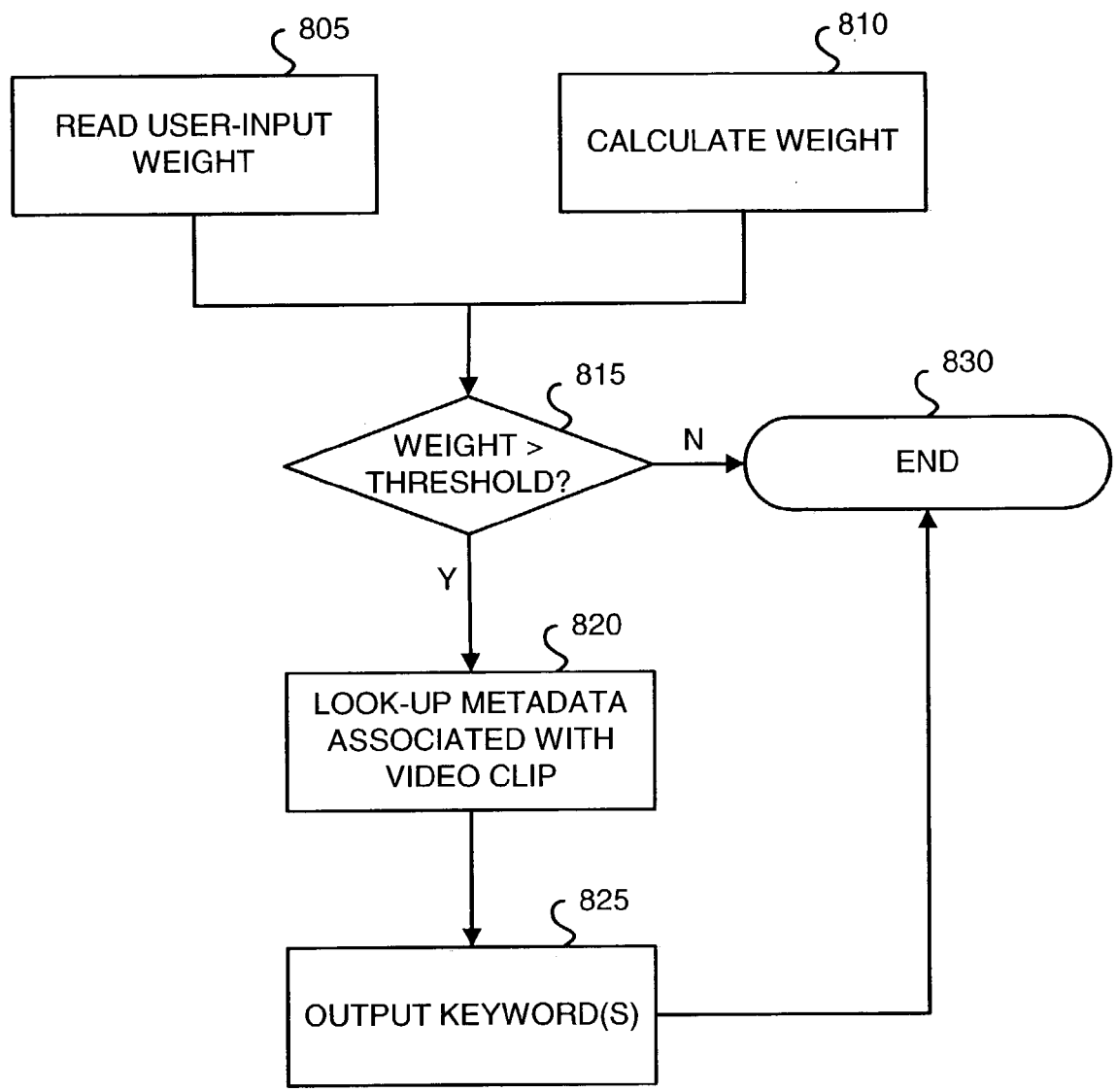
FIG. 8 is a flow diagram for processing feedback from a client, according to one embodiment of the invention.

FIG. 8 is a flow diagram for processing feedback from a client, according to a second embodiment of process step 630, which is related to the second and third embodiments of receiving step 625. Steps 805 and 810 may be used in the alternative. The process thus begins by reading a user-input relevance weight for a video clip in step 805 (i.e., data resulting from a rating, ranking, or voting by a user), or by calculating the weight of a video clip based on user actions in step 810. Then, in conditional step 815, the weight is compared to a predetermined weight threshold. If the weight exceeds the predetermined weight threshold, then the process advances to step 820 to look-up metadata associated with the video clip, and outputs the metadata as keywords in step 825. The process terminates in step 830 if the weight does not exceed the predetermined weight threshold, or upon the completion of step 825. Thus, relevance weights can be processed according to the flow in FIG. 8 so that metadata from the most relevant video clips are output from feedback processing step 630.

Figure 9:
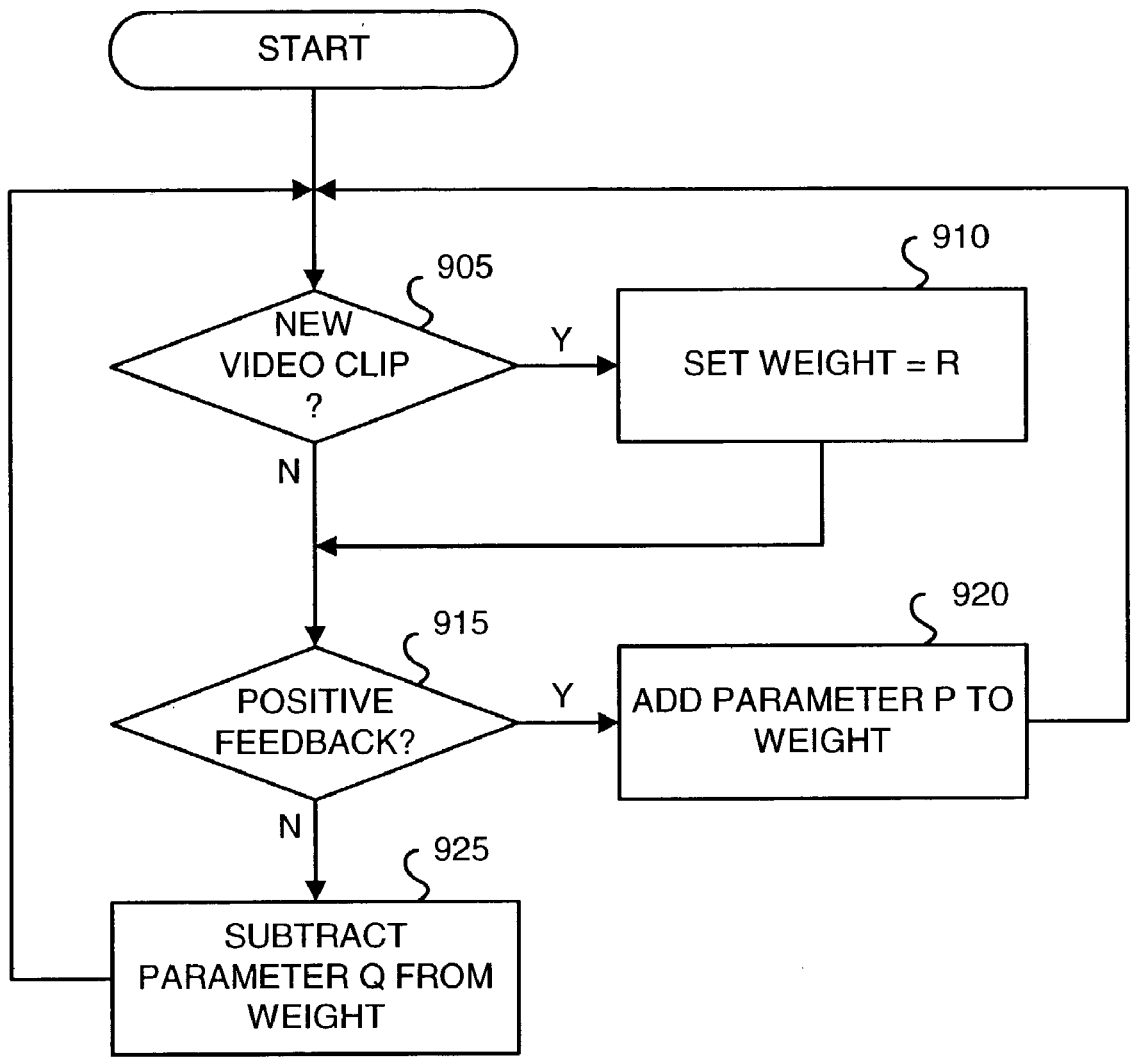
FIG. 9 is a flow diagram for calculating a relevance parameter, according to one embodiment of the invention.

FIG. 9 is a flow diagram for calculating a relevance parameter (weight) according to one embodiment of step 810. This process relates to processing feedback in the form of user actions. As shown therein, processing begins in step 905 by determining whether the feedback is related to a new video clip. If the video clip is new (i.e., no feedback has previously been received from a user), then a weight parameter is set to a predetermined value R in step 910 before advancing to step

915. If the video clip is not new (i.e., at least one piece of feedback has already been received from the user for this video clip), then the process is promoted directly to conditional step 915.

In conditional step 915, the process determines whether the received feedback is positive (ie., whether the user's feedback is indicative that the video clip is relevant to a user's interests). If the feedback is determined to be positive, then a parameter P is added to the weight parameter in step 920, and the process returns to step 905 to process the next feedback item. If, however, the feedback is not positive (i.e., the feedback is negative), then the process subtracts a parameter Q from the weight parameter in step 920 before returning to step 905. Thus, all user actions relating to a particular video clip are factored into the calculation of a single weight as illustrated in FIG. 9.

Conditional step 915 can operate so that cases where a user selects a video clip from a menu, plays more than 50% of a video clip or other media content, replays a video clip, stores a video clip, or forwards a video clip via email are representative of positive feedback. Conversely, conditional step 915 operate so that user actions such as fast-forwarding or skipping (not selecting a presented video clip or other media content for play) are negative feedback. The execution of conditional step 915 may include checking the video clip or other media content against previously presented content to ensure that forwarding or skipping content that is duplicative or very similar to what has already been presented to the user is not treated as negative feedback. Accordingly, user feedback is classified as positive or negative, and a relevance parameter can be calculated according to the process flow in FIG. 9.

Each of the parameters P, Q, and R depicted in FIG. 9 may be a constant or a variable. Where a parameter is variable, it can be derived from a table or formula.

In an embodiment of the process depicted in FIG. 9 where both P and Q are constants, all positive feedback influences the weight equally, and all negative feedback influences the weight equally. Thus, where a user plays more than 50% of a selected video clip and then stores the video clip for future use, for instance, the weight of the video clip is R+2*P.

Figure 10:
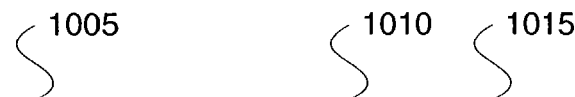
FIG. 10 is an illustration of a table for assigning values to feedback parameters, according to one embodiment of the invention.

In an embodiment of the process depicted in FIG. 9 where P and Q are both based on table-assigned values, user actions may not be weighed the same. FIG. 10 is an illustration of a table for assigning values to feedback parameters, according to one embodiment of the process depicted in FIG. 9. As shown therein, the user actions listed in column 1005 are assigned positive weights P in column 1010 or negative weights Q in column 1015. According to the example in FIG. 10, the process would add 4 to the relevance weight of a video clip in step 920 where a user replays a video clip, but would only add 2 to the relevance weight of a video clip in step 920 where a user forwards the video clip via email. Skipping a media clip alternatively refers to passively not selecting a media clip or actively deselecting a media clip. Other weights can be assigned to these and other actions. But, in general, each of the positive weights P and negative weights Q may be assigned different values.

As described above, the media clips referred to in FIG. 10 may be video clips, audio clips, or other media clips.

In an embodiment of the process depicted in FIG. 9 where both P and Q are determined by formulas, user actions again may not be weighed the same. For example, the value of parameter P may be determined based on the proportion of a video clip that is viewed by the user. Other formulas are also possible.

Parameter R may be a constant reset value, for example 0. In the alternative, parameter R is an initial weight calculated in step 615 without the benefit of user feedback (see, e.g., step 1110 in FIG. 11 below). In this latter case, the process in FIG. 9 adjusts the previously calculated weight based on the user feedback.

The preceding discussion of user feedback processing provides a foundation for the following section.

Identifying Video Clips or Other Media Content in View of Prior Feedback

Figure 11:
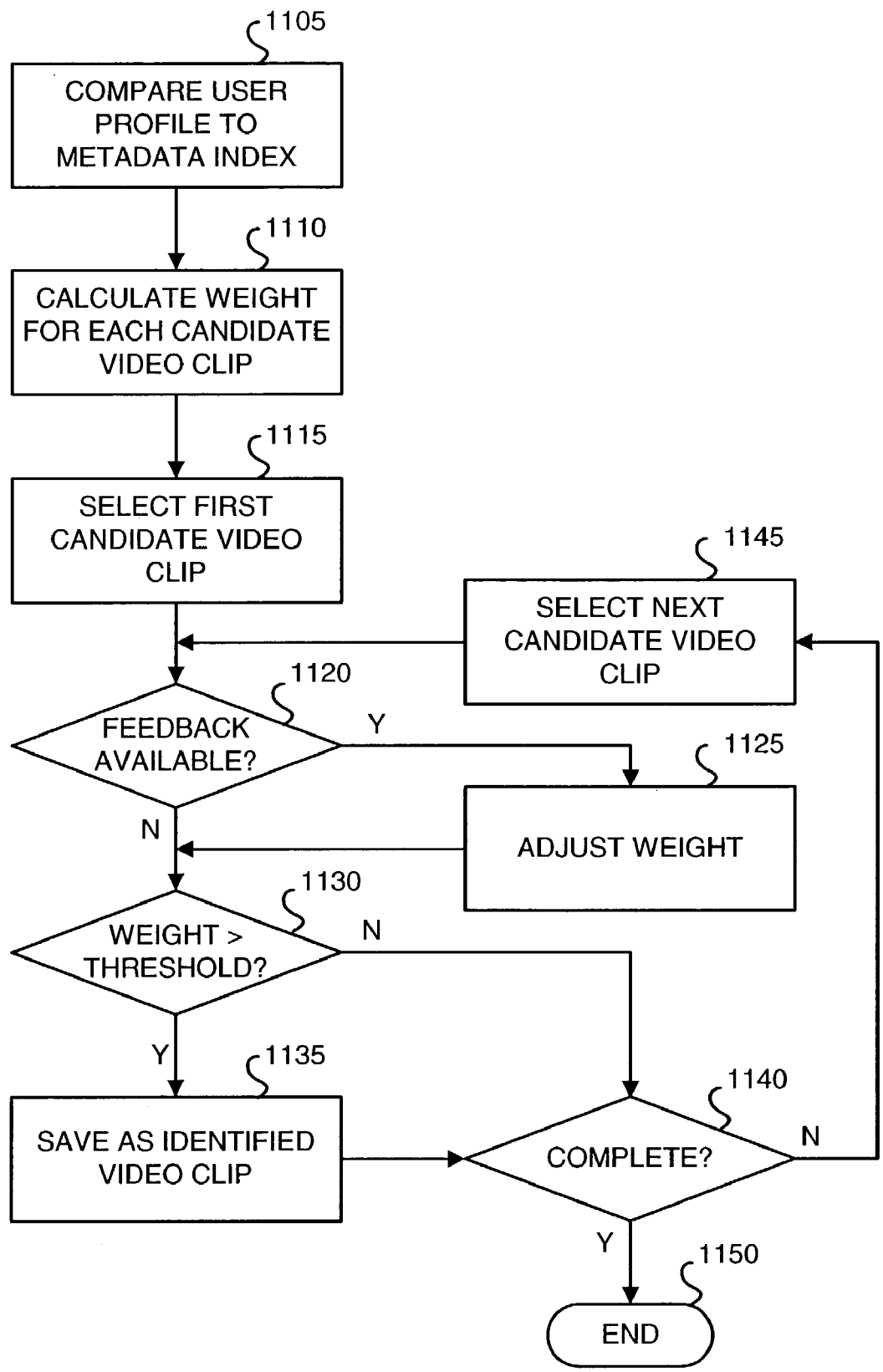
FIG. 11 is a flow diagram for identifying video clips or other media, according to one embodiment of the invention.

FIG. 11 is a flow diagram for identifying video clips or other media, according to one embodiment of step 615. For the illustrated embodiment, it is necessary that the user profile is updated in step 635 with a user feedback parameter and associated video clip designator instead of, or in combination with, keywords. The user feedback parameter may be an indication that the user's overall feedback for the associated video clip was either positive or negative. In the alternative, the user feedback parameter may be a user-assigned weight or a calculated weight for an associated video clip, as described above with reference to steps 805 and 810, respectively.

As shown in FIG. 11, the process begins by comparing keywords or other information in the user profile to a metadata index in step 1105. Next, a weight is calculated for candidate video clips in step 1110. As used throughout this document, the weight is an indication of relevance to the user's interests. The process selects a first candidate video clip in step 1115. Step 1115 may be executed, for example, by selecting the candidate video clip associated with the highest weight (as calculated in step 1110). A determination is made in conditional step 1120 as to whether feedback exists for the present user. In other words, the inquiry in conditional step 1120 is whether the user profile for the present user includes a user feedback parameter associated with a video clip that has been previously presented to the user. The user profile may include a feedback parameter for each of several associated video clips that have been presented to the user in the past.

If the result of conditional step 1120 is in the affirmative, the process advances to weight adjusting step 1125. The weight adjustment in step 1125 is a function of: a) correlation between the candidate video clip to a previously presented video clip; and b) the feedback parameter of the previously presented video clip. For example, where a candidate video clip receives a low weight in step 1110 (indicating low relevance), where the candidate video clip has a high correlation with a previously presented video clip, and where the feedback parameter associated with the previously presented video clip is positive, then the weight of the candidate video clip is increased in step 1125. Likewise, where a candidate video clip receives a high weight in step 1110 (indicating high relevance), where the candidate video clip has a high correlation with a previously presented video clip, and where the feedback parameter associated with the previously presented video clip is negative, then the weight of the candidate video clip is decreased in step 1125.

If the result of conditional step 1120 is negative, or subsequent to weight adjusting step 1125, the process advances to conditional step 1130 where it is determined whether the weight of the candidate video clip exceeds a predetermined weight threshold. If so, then the candidate video clip is saved as an identified video clip in step 1135.

If the result of conditional step 1130 is negative, or subsequent to step 1135, the process advances to conditional step 1140 to determine whether the identification process is complete. Step 1140 may consider, for example, whether all candidate video clips have been assessed. In the alternative, step 1140 may compare the number of video clips saved in step 1135 to a predetermined presentation threshold. For example, the identification process illustrated in FIG. 11 may end in step 1150 after 10 video clips have been identified. Where conditional step 1140 determines that the process is not complete, the process advances to step 1145 to select a next candidate video clip before returning to conditional step 1120. Step 1145 can be executed by selecting the candidate video clip having the next highest weight based on calculation step 1110.

Accordingly, the identification of video clips in step 615 can be improved based on previous user feedback for similar video clips, as shown in FIG. 11.

In an alternative embodiment of step 615, the process illustrated in FIG. 11 is amended so that conditional step 1120 and adjustment step 1125 are deleted. In such an embodiment, selection step 1115 and selection step 1145 directly feed conditional step 1130.

The weight threshold used in conditional step 1130 can be automatically adjusted as described below.

Adjusting the Weight Threshold

Figure 12:
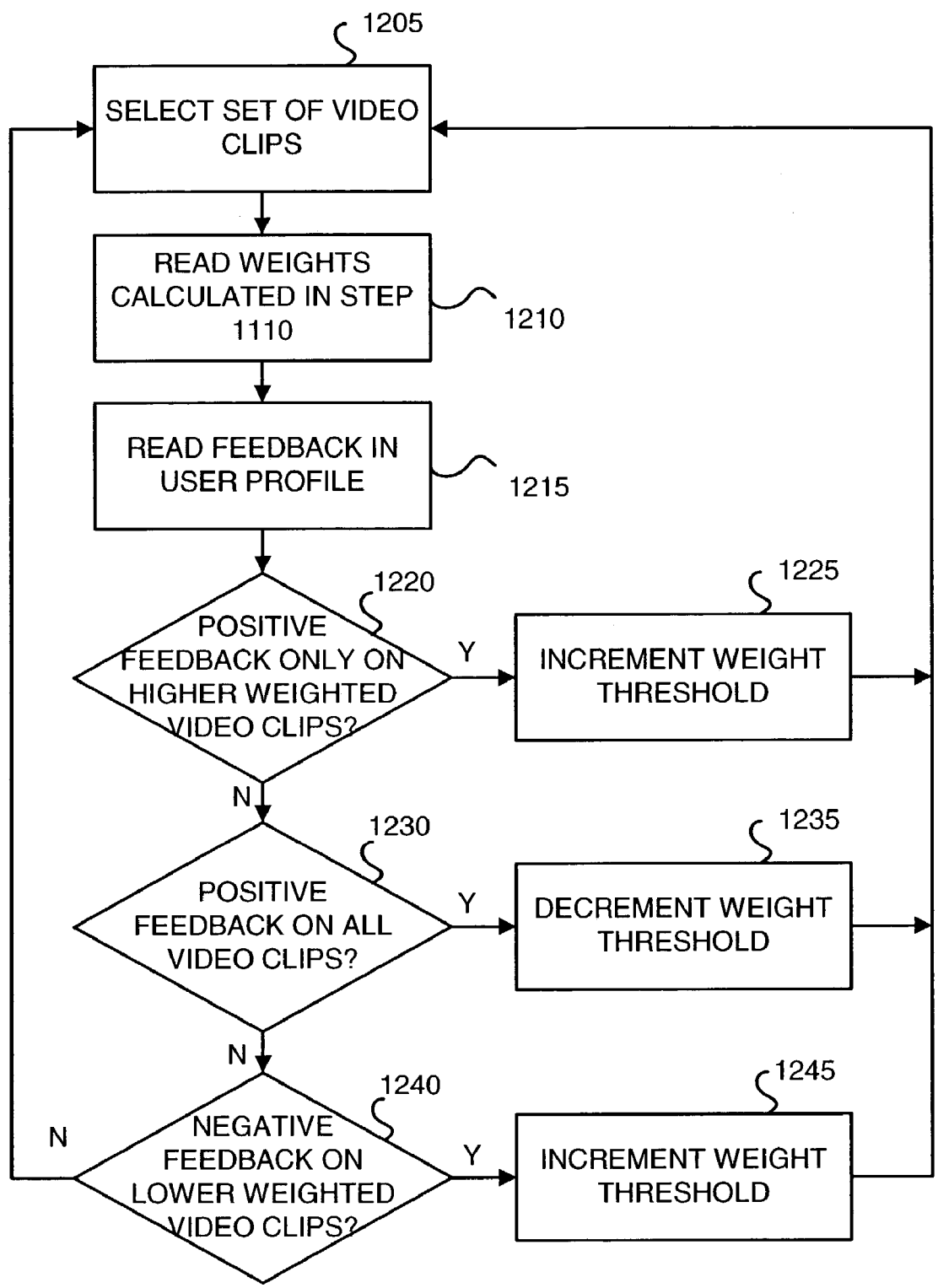
FIG. 12 is a flow diagram for adjusting a weight threshold, according to one embodiment of the invention.

FIG. 12 is a flow diagram for adjusting a weight threshold, for example the weight threshold used in conditional step 1130, according to one embodiment of the invention. The process illustrated in FIG. 12 is applicable to the process illustrated in FIG. 11; it is also applicable to the amended identification process that does not include steps 1120 and 1125.

Execution of the automatic adjustment process described below may be most appropriate after receiving user feedback associated with multiple presented video clips. The process illustrated in FIG. 12 again requires that a positive/negative user feedback parameter be associated with each presented video clip and stored in the user profile (or, alternatively, in a persistent data store).

As shown in FIG. 12, the process begins by selecting a set of previously presented video clips in step 1205. In step 1210, the process reads weights that were calculated in step 1110 for each of the video clips in the selected set. Then, in step 1215, the process reads positive/negative user feedback parameters that were stored in step 635 for each of the video clips in the selected set.

It is noted that the weight of each video clip in the set of previously presented video clips exceeds the current weight threshold. As an example, consider the case where the prior weight threshold was 5, and the set of previously presented video clips includes five video clips having calculated weights of 6, 7, 8, 9, and 10 (video clips having weights of 5 or less were never presented to the user).

It is determined whether positive feedback exists for only the higher weighted video clips in conditional step 1220. For instance, where only the video clips having calculated weights of 9 and 10 have positive user feedback associated with them, then conditional step 1220 would be answered in the affirmative, and the weight threshold would be incremented in step 1225 (for example from 5 to 6).

If conditional step 1220 is answered in the negative, then it is determined in conditional step 1230 whether positive feedback exists for all video clips in the set of previously presented video clips. For instance, where each of the video clips having calculated weights of 6, 7, 8, 9 and 10 have positive user feedback associated with them, then conditional step 1230 would be answered in the affirmative (indicating that the threshold may be too high), and the weight threshold would be decremented in step 1235 (for example from 5 to 4).

If conditional step 1230 is answered in the negative, then it is determined in conditional step 1240 whether negative feedback exists for lower weighted video clips in the set of previously presented video clips. For instance, where only the video clips having calculated weights of 6 and 7 have negative user feedback associated with them, then conditional step 1230 would be answered in the affirmative (indicating that the threshold was too low), and the weight threshold would be incremented in step 1245 (for example from 5 to 6).

The process repeats itself for another set of previously presented video clips by returning to step 1205 upon the completion of steps 1225, 1235, and/or 1245, or subsequent to a negative response in conditional step 1240.

Accordingly, the process illustrated in FIG. 12 makes adjustments to the weight threshold used in conditional step 1130 of identification step 615. The consequence of such an adjustment to the weight threshold is an improvement in the relevance of video clips that are identified in step 615 and presented to the user in step 620.

The same or similar process illustrated in FIG. 12 can also be used to adjust the weight threshold used in conditional step 815 of processing step 630 to improve the selection of keywords, feedback parameters, or other information used to update the user profile or persistent data store. Moreover, the weight thresholds used in conditional steps 815 and 1130 may be the same or different, according to design choice.

Architecture

Figure 13:
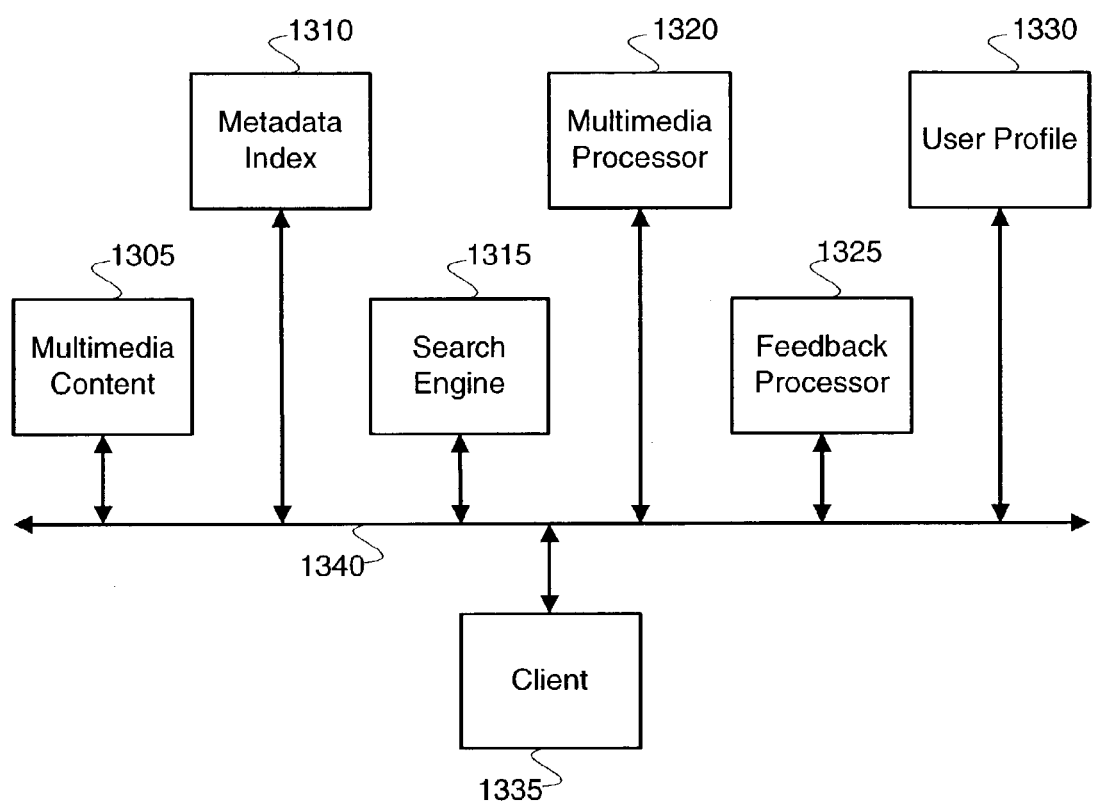
FIG. 13 is a block diagram of a functional architecture for transmitting media and processing feedback related to the media, according to one embodiment of the invention.

FIG. 13 is a block diagram of a functional architecture for transmitting media and processing feedback related to the media, according to one embodiment of the invention. As shown therein, various functions are networked, for example in a client-server environment. Thus, Multimedia Content 1305, Metadata Index 1310, Search Engine 1315, Multimedia Processor 1320, Feedback Processor 1325, and User Profile 1330 can represent servers having processing and/or storage, capability, the servers being coupled by link 1340 to each other and to client 1335.

Client 1335 may be a personal computer, tablet PC, electronic picture frame device, radio, pager, personal digital assistant, facsimile, smart phone, wireless phone, wired phone, television, personal video recorder, game console, or other device capable of delivering media content to a user.

In one embodiment, the servers depicted in FIG. 13 are, or include, features depicted in FIG. 2. For example, Multimedia Content 1305 may be or include Video Server 220 and/or Video Storage 210; Metadata Index 1310 may be or include Meta DB 215; Search Engine 1315 may be or include DVL Server 225 and/or eClips server 230; Multimedia Processor 1320 may be or include Video Capture/Media analysis 205; User profile 1330 may be or include Profile DB 245; and Client 1335 may be or include eClips Client 250.

Advantageously, the architecture illustrated in FIG. 13 can be configured to perform the process illustrated in FIG. 6 using standard programming languages, database structures, and networking protocols. For example, search engine 1315 can be configured to perform step 615 (including the embodiment in FIG. 11). In addition, Feedback Processor 1325 can be configured to perform steps 625 and/or 630 (including the processes depicted in FIGS. 7-10).

In alternative embodiments of the functional architecture, the servers illustrated in FIG. 13 are not all coupled to a common link. In addition, a persistent data store (described above but not shown in FIG. 13) may be a part of the functional architecture. For instance, a persistent data store may be hosted on a server (not shown in FIG. 13) that is coupled to link 1340. In some embodiments, functional blocks may be combined or further parsed according to ordinary design considerations.

CONCLUSION

In conclusion, a service for providing personalized multimedia assets such as electronic clips from video programs, based upon personal profiles, has been presented. In one embodiment, it uses text to ascertain the appropriate clips to extract and then assembles these clips into a single session. Thus, users only see the specific portions of videos that they desire. Therefore, users do not have to undertake the arduous task of manually finding desired video segments, and further don't have to manually select the specified videos one at a time. Rather, the invention generates all of the desired content automatically. Moreover, one embodiment of the invention provides a system and method for receiving and processing user feedback to improve the relevance of subsequently identified and presented video clips or other media.

While this invention has been described in various explanatory embodiments, other embodiments and variations can be effected by a person of ordinary skill in the art without departing from the scope of the invention.

What is claimed is:

1. A method for searching comprising:
    extracting by a multimedia processor a media clip from a media presentation;
    calculating an initial weight of the media clip based on a profile of a user;
    comparing the initial weight of the media clip to a predetermined weight threshold;
    identifying the media clip if the initial weight of the media clip exceeds the predetermined weight threshold;
    providing access to the media clip to the user;
    adjusting the initial weight of the media clip based at least in part on feedback from the user;
    selecting a plurality of media clips previously viewed by the user; and
    automatically adjusting the predetermined weight threshold based at least on feedback from the user for the selected plurality of media clips previously viewed by the user;
    wherein:
    the plurality of media clips previously viewed by the user comprises a first plurality of media clips;
    the predetermined weight threshold comprises a first weight threshold; and
    automatically adjusting the predetermined weight threshold based at least on feedback from the user for the selected plurality of media clips previously viewed by the user comprises:
        sorting the first plurality of media clips into a second plurality of media clips and a third plurality of media clips, wherein:
            each of the second plurality of media clips has an associated initial weight greater than a second weight threshold, wherein the second weight threshold is greater than the first weight threshold; and
            each of the third plurality of media clips has an associated initial weight less than or equal to the second weight threshold;
        determining whether at least one of the third plurality of previously viewed media clips has an associated user feedback parameter that is positive;
        upon determining that none of the third plurality of media clips has an associated user feedback parameter that is positive, incrementing the first weight threshold;
        upon determining that at least one of the third plurality of media clips has an associated user feedback parameter that is positive, determining whether all of the first plurality of media clips have an associated user feedback parameter that is positive;
        upon determining that all of the first plurality of media clips have an associated user feedback parameter that is positive, decrementing the first weight threshold;
        upon determining that all of the first plurality of media clips do not have an associated user feedback parameter that is positive, determining whether at least one of the second plurality of media clips has an associated user feedback that is negative;
        upon determining that none of the second plurality of media clips has an associated user feedback that is negative, incrementing the first weight threshold; and
        upon determining that at least one of the second plurality of previously viewed media clips has an associated user feedback that is negative, maintaining the first weight threshold.

2. The method of claim 1, further comprising adjusting the initial weight of the media clip based on similarity to a different media clip, the different media clip being associated with a user feedback parameter.

3. The method of claim 1, wherein providing access to the media clip includes providing access to closed captioned text associated with the media clip.

4. The method of claim 1, wherein adjusting the initial weight of the media clip based at least in part on feedback from the user includes receiving a selection of text.

5. The method of claim 4, further comprising processing the feedback, wherein the processing includes:
    selecting a word from the selection of text;
    determining a frequency of the word; and
    comparing the frequency to a predetermined frequency threshold.

6. The method of claim 5, wherein determining the frequency includes:
    measuring a number of times that the word appears in the selection of text; and
    adjusting the frequency based on occurrence of the word in native language literature.

7. The method of claim 1, wherein adjusting the initial weight of the media clip based at least in part on feedback from the user includes receiving a media clip ranking.

8. The method of claim 7, further comprising processing the feedback, wherein processing includes:
    comparing the media clip ranking to the predetermined weight threshold; and
    outputting metadata associated with the media clip if the media clip ranking exceeds the predetermined weight threshold.

9. The method of claim 1, wherein adjusting the initial weight of the media clip based at least in part on feedback from the user includes receiving a user action.

10. The method of claim 9, wherein the user action comprises viewing more than a predetermined portion of the media clip.

11. The method of claim 9, wherein the user action comprises storing the video clip.

12. The method of claim 9, wherein the user action comprises skipping the media clip.

13. The method of claim 9, further comprising processing the feedback, wherein processing includes:
    setting a calculated weight to a baseline weight;
    determining whether the user action is positive;

adding a first parameter to the calculated weight if the user action is positive; and subtracting a second parameter from the calculated weight if the user action is negative.

14. The method of claim 13, wherein adding the first parameter includes reading the first parameter from a table, the table having a plurality of user actions and an associated plurality of first parameters.

15. The method of claim 1, further comprising processing the feedback to produce information.

16. The method of claim 15, further comprising updating the profile of the user with the information.

17. A non-transitory computer readable medium comprising computer program instructions capable of being executed in a processor and defining a method comprising:

extracting a media clip from a media presentation;
calculating an initial weight of the media clip based on a profile of a user;
comparing the initial weight of the media clip to a predetermined weight threshold;
identifying the media clip if the initial weight of the media clip exceeds the predetermined weight threshold;
presenting the media clip to the user;
adjusting the initial weight of the media clip based at least in part on feedback from the user;
selecting a plurality of media clips previously viewed by the user; and
automatically adjusting the predetermined weight threshold based at least on feedback from the user for the selected plurality of media clips previously viewed by the user;

wherein:
the plurality of media clips previously viewed by the user comprises a first plurality of media clips;
the predetermined weight threshold comprises a first weight threshold; and
automatically adjusting the predetermined weight threshold based at least on feedback from the user for the selected plurality of media clips previously viewed by the user comprises:
sorting the first plurality of media clips into a second plurality of media clips and a third plurality of media clips, wherein:
each of the second plurality of media clips has an associated initial weight greater than a second weight threshold, wherein the second weight threshold is greater than the first weight threshold; and
each of the third plurality of media clips has an associated initial weight less than or equal to the second weight threshold;
determining whether at least one of the third plurality of previously viewed media clips has an associated user feedback parameter that is positive;
upon determining that none of the third plurality of media clips has an associated user feedback parameter that is positive, incrementing the first weight threshold;
upon determining that at least one of the third plurality of media clips has an associated user feedback parameter that is positive, determining whether all of the first plurality of media clips have an associated user feedback parameter that is positive;
upon determining that all of the first plurality of media clips have an associated user feedback parameter that is positive, decrementing the first weight threshold;

upon determining that all of the first plurality of media clips do not have an associated user feedback parameter that is positive, determining whether at least one of the second plurality of media clips has an associated user feedback that is negative;
upon determining that none of the second plurality of media clips has an associated user feedback that is negative, incrementing the first weight threshold; and
upon determining that at least one of the second plurality of previously viewed media clips has an associated user feedback that is negative, maintaining the first weight threshold.

18. A system for searching, the system comprising:
an interface to a client;
a memory including a user profile;
a search engine coupled to the interface to the client and to the memory, the search engine configured to perform searching at least one source video to identify a video clip based on the user profile by calculating an initial weight of the video clip based on the user profile, comparing the initial weight of the video clip to a predetermined weight threshold, and identifying the video clip if the initial weight of the video clip exceeds the predetermined weight threshold; and
a feedback processor coupled to the interface to the client and to the memory, the feedback processor configured to perform receiving feedback from the client, adjusting the initial weight of the video clip based at least in part on the feedback, selecting a plurality of media clips previously viewed by the user, automatically adjusting the predetermined weight threshold based at least on feedback from the user for the selected plurality of media clips previously viewed by the user, and updating the user profile based on the feedback;

wherein:
the plurality of media clips previously viewed by the user comprises a first plurality of media clips;
the predetermined weight threshold comprises a first weight threshold; and
automatically adjusting the predetermined weight threshold based at least on feedback from the user for the selected plurality of media clips previously viewed by the user comprises:
sorting the first plurality of media clips into a second plurality of media clips and a third plurality of media clips, wherein:
each of the second plurality of media clips has an associated initial weight greater than a second weight threshold, wherein the second weight threshold is greater than the first weight threshold; and
each of the third plurality of media clips has an associated initial weight less than or equal to the second weight threshold;
determining whether at least one of the third plurality of previously viewed media clips has an associated user feedback parameter that is positive;
upon determining that none of the third plurality of media clips has an associated user feedback parameter that is positive, incrementing the first weight threshold;
upon determining that at least one of the third plurality of media clips has an associated user feedback parameter that is positive, determining whether all of the first plurality of media clips have an associated user feedback parameter that is positive;

upon determining that all of the first plurality of media clips have an associated user feedback parameter that is positive, decrementing the first weight threshold;

upon determining that all of the first plurality of media clips do not have an associated user feedback parameter that is positive, determining whether at least one of the second plurality of media clips has an associated user feedback that is negative;

upon determining that none of the second plurality of media clips has an associated user feedback that is negative, incrementing the first weight threshold; and upon determining that at least one of the second plurality of previously viewed media clips has an associated user feedback that is negative, maintaining the first weight threshold.

19. A method for processing user feedback related to a first media clip with a feedback processor, the user feedback being associated with a plurality of user actions, comprising:

setting a weight of the first media clip to one of a reset value and a previously determined weight;

determining whether each of the plurality of user actions are positive;

adding a first parameter to the weight for each of the plurality of user actions that are positive;

subtracting a second parameter from the weight for each of the plurality of user actions that are negative;

comparing the weight to a predetermined weight threshold;

identifying metadata associated with the first media clip if the weight exceeds the predetermined weight threshold;

adding the identified metadata to at least one of a user profile and a persistent data store;

selecting a plurality of media clips previously viewed by the user; and automatically adjusting the predetermined weight threshold based at least on feedback from the user for the selected plurality of media clips previously viewed by the user;

wherein:

the plurality of media clips previously viewed by the user comprises a first plurality of media clips;

the predetermined weight threshold comprises a first weight threshold; and automatically adjusting the predetermined weight threshold based at least on feedback from the user for the selected plurality of media clips previously viewed by the user comprises:

sorting the first plurality of media clips into a second plurality of media clips and a third plurality of media clips, wherein:

each of the second plurality of media clips has an associated initial weight greater than a second weight threshold, wherein the second weight threshold is greater than the first weight threshold; and each of the third plurality of media clips has an associated initial weight less than or equal to the second weight threshold;

determining whether at least one of the third plurality of previously viewed media clips has an associated user feedback parameter that is positive;

upon determining that none of the third plurality of media clips has an associated user feedback parameter that is positive, incrementing the first weight threshold;

upon determining that at least one of the third plurality of media clips has an associated user feedback parameter that is positive, determining whether all of the first plurality of media clips have an associated user feedback parameter that is positive;

upon determining that all of the first plurality of media clips have an associated user feedback parameter that is positive, decrementing the first weight threshold;

upon determining that all of the first plurality of media clips do not have an associated user feedback parameter that is positive, determining whether at least one of the second plurality of media clips has an associated user feedback that is negative;

upon determining that none of the second plurality of media clips has an associated user feedback that is negative, incrementing the first weight threshold; and upon determining that at least one of the second plurality of previously viewed media clips has an associated user feedback that is negative, maintaining the first weight threshold.

20. The method of claim 19, further comprising identifying a second media clip based on a metadata index and at least one of the user profile and the persistent data store.

21. A non-transitory computer readable medium comprising computer program instructions capable of being executed in a processor and defining a method comprising:

setting a weight of a media clip to one of a reset value and a previously determined weight;

determining whether each of a plurality of user actions are positive;

adding a first parameter to the weight for each of the plurality of user actions that are positive;

subtracting a second parameter from the weight for each of the plurality of user actions that are negative;

comparing the weight to a predetermined weight threshold;

identifying metadata associated with the media clip if the weight exceeds the predetermined weight threshold;

adding the metadata to at least one of a user profile and a persistent data store;

selecting a plurality of media clips previously viewed by the user; and automatically adjusting the predetermined weight threshold based at least on feedback from the user for the selected plurality of media clips previously viewed by the user;

wherein:

the plurality of media clips previously viewed by the user comprises a first plurality of media clips;

the predetermined weight threshold comprises a first weight threshold; and automatically adjusting the predetermined weight threshold based at least on feedback from the user for the selected plurality of media clips previously viewed by the user comprises:

sorting the first plurality of media clips into a second plurality of media clips and a third plurality of media clips, wherein:

each of the second plurality of media clips has an associated initial weight greater than a second weight threshold, wherein the second weight threshold is greater than the first weight threshold; and each of the third plurality of media clips has an associated initial weight less than or equal to the second weight threshold;

determining whether at least one of the third plurality of previously viewed media clips has an associated user feedback parameter that is positive;

upon determining that none of the third plurality of media clips has an associated user feedback parameter that is positive, incrementing the first weight threshold;

upon determining that at least one of the third plurality of media clips has an associated user feedback parameter that is positive, determining whether all of the first plurality of media clips have an associated user feedback parameter that is positive;

upon determining that all of the first plurality of media clips have an associated user feedback parameter that is positive, decrementing the first weight threshold;

upon determining that all of the first plurality of media clips do not have an associated user feedback parameter that is positive, determining whether at least one of the second plurality of media clips has an associated user feedback that is negative;

upon determining that none of the second plurality of media clips has an associated user feedback that is negative, incrementing the first weight threshold; and upon determining that at least one of the second plurality of previously viewed media clips has an associated user feedback that is negative, maintaining the first weight threshold.

\* \* \* \* \*

UNITED STATES PATENT AND TRADEMARK OFFICE
CERTIFICATE OF CORRECTION

PATENT NO. : 8,060,906 B2
APPLICATION NO. : 10/455790
DATED : November 15, 2011
INVENTOR(S) : Lee Begeja et al.

It is certified that error appears in the above-identified patent and that said Letters Patent is hereby corrected as shown below:

On the Title page, under item (56), the following foreign references should appear:

-- CA  2,320,568  3/2001 --
-- WO  WO 96/27840  9/1996 --

Signed and Sealed this
Fourteenth Day of February, 2012

David J. Kappos
*Director of the United States Patent and Trademark Office*